(12) United States Patent
Yamamoto et al.

(10) Patent No.: US 11,777,140 B2
(45) Date of Patent: Oct. 3, 2023

(54) SOLID ELECTROLYTE, METHOD FOR PRODUCING SOLID ELECTROLYTE, AND COMPOSITE BODY

(71) Applicant: Seiko Epson Corporation, Toyko (JP)

(72) Inventors: Hitoshi Yamamoto, Chino (JP); Tsutomu Teraoka, Matsumoto (JP); Tomofumi Yokoyama, Matsumoto (JP)

(73) Assignee: SEIKO EPSON CORPORATION

( * ) Notice: Subject to any disclaimer, the term of this patent is extended or adjusted under 35 U.S.C. 154(b) by 53 days.

(21) Appl. No.: 17/192,944

(22) Filed: Mar. 5, 2021

(65) Prior Publication Data

US 2021/0280901 A1    Sep. 9, 2021

(30) Foreign Application Priority Data

Mar. 6, 2020  (JP) ................................. 2020-038526

(51) Int. Cl.
*H01M 10/0562*    (2010.01)
*C01G 35/00*    (2006.01)
*C01G 33/00*    (2006.01)

(52) U.S. Cl.
CPC ...... *H01M 10/0562* (2013.01); *C01G 33/006* (2013.01); *C01G 35/006* (2013.01); *C01P 2002/52* (2013.01); *C01P 2006/40* (2013.01); *H01M 2300/0071* (2013.01)

(58) Field of Classification Search
None
See application file for complete search history.

(56) References Cited

U.S. PATENT DOCUMENTS

2018/0301754 A1*  10/2018  Badding ............... C04B 35/488

FOREIGN PATENT DOCUMENTS

CN      102617140 A    8/2012
JP      2009-215130 A  9/2009

OTHER PUBLICATIONS

ACS Appl. Mater. Interfaces 2014, 6, 20, 17606-17615, Publication Date: Sep. 29, 2014 (Year: 2014).*

* cited by examiner

*Primary Examiner* — Lucas J. O'Donnell
(74) *Attorney, Agent, or Firm* — Harness, Dickey & Pierce, P.L.C.

(57) ABSTRACT

A solid electrolyte according to the present disclosure is represented by the following compositional formula (1).

$$Li_{7-x}(La_{3-z}Y_z)(Zr_{2-x}M_x)O_{12} \quad (1)$$

In the formula (1), x and z satisfy $0.00 < x < 1.10$, and $0.00 < z \leq 0.15$, and M is two or more types of elements selected from the group consisting of Nb, Ta, and Sb.

5 Claims, 12 Drawing Sheets

SOLID ELECTROLYTE, METHOD FOR PRODUCING SOLID ELECTROLYTE, AND COMPOSITE BODY

The present application is based on, and claims priority from JP Application Serial Number 2020-038526, filed on Mar. 6, 2020, the disclosure of which is hereby incorporated by reference herein in its entirety.

BACKGROUND

1. Technical Field

The present disclosure relates to a solid electrolyte, a method for producing a solid electrolyte, and a composite body.

2. Related Art

As a power supply for many electrical apparatuses such as portable information apparatuses, a lithium battery (including a primary battery and a secondary battery) has been used. Above all, as a lithium battery that achieves both a high energy density and safety, an all-solid-state lithium battery using a solid electrolyte for lithium conduction between positive and negative electrodes has been proposed (see, for example, JP-A-2009-215130 (Patent Document 1).

A solid electrolyte can conduct lithium ions without using an organic electrolyte, and leakage of an electrolyte solution or volatilization of an electrolyte solution due to drive heat generation, or the like does not occur, and therefore, it has been attracting attention as a highly safe material.

As a solid electrolyte to be used in such an all-solid-state lithium battery, an oxide-based solid electrolyte having a high lithium ion conduction property, an excellent insulation property, and high chemical stability has been widely known. As such an oxide, a lithium lanthanum zirconate-based material has a remarkably high lithium ion conductivity, and application thereof to a battery has been expected.

However, such a solid electrolyte has a high lithium ion conduction property, and therefore has a problem that lithium carbonate is easily generated by the existence of moisture or carbon dioxide in the air, or the like, and the lithium ion conductivity is likely to decrease over time.

SUMMARY

The present disclosure has been made for solving the above problem and can be realized as the following application examples.

A solid electrolyte according to an application example of the present disclosure is represented by the following compositional formula (1).

In the formula (1), x and z satisfy $0.00 < x < 1.10$, and $0.00 < z \leq 0.15$, and M is two or more types of elements selected from the group consisting of Nb, Ta, and Sb.

Further, a method for producing a solid electrolyte according to an application example of the present disclosure includes:
a mixing step of mixing multiple types of raw materials containing metal elements included in the following compositional formula (1), thereby obtaining a mixture;
a first heating step of subjecting the mixture to a first heating treatment thereby forming a calcined body; and
a second heating step of subjecting the calcined body to a second heating treatment thereby forming a crystalline solid electrolyte represented by the following compositional formula (1).

In the formula (1), x and z satisfy $0.00 < x < 1.10$, and $0.00 < z \leq 0.15$, and M is two or more types of elements selected from the group consisting of Nb, Ta, and Sb.

Further, a composite body according to an application example of the present disclosure includes:
an active material; and
the solid electrolyte according to the application example of the present disclosure that coats apart of a surface of the active material.

DESCRIPTION OF EXEMPLARY EMBODIMENTS

Figure 1:
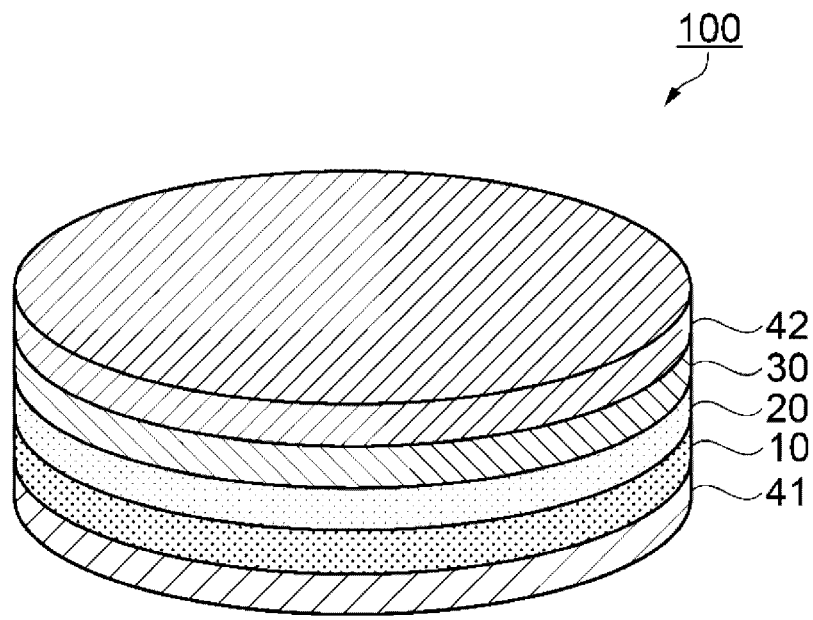
FIG. 1 is a schematic perspective view schematically showing a configuration of a lithium-ion battery as a secondary battery of a first embodiment.

Hereinafter, preferred embodiments of the present disclosure will be described in detail.

[1] Solid Electrolyte

First, a solid electrolyte according to the present disclosure will be described.

The solid electrolyte according to the present disclosure is represented by the following compositional formula (1).

$$Li_{7-x}(La_{3-z}Y_z)(Zr_{2-x}M_x)O_{12} \qquad (1)$$

In the formula (1), x and z satisfy $0.00 < x < 1.10$, and $0.00 < z \le 0.15$, and M is two or more types of elements selected from the group consisting of Nb, Ta, and Sb.

By satisfying such conditions, a solid electrolyte capable of favorably maintaining a high total ion conductivity even under the atmosphere can be provided. More specifically, by substituting some of the lanthanum sites of a lithium lanthanum zirconate-based material with yttrium, acid resistance is enhanced, and the generation of lithium carbonate caused by carbon dioxide can be suppressed, so that a solid electrolyte that exhibits a high total ion conductivity even under the atmosphere can be provided.

On the other hand, when the conditions as described above are not satisfied, an excellent effect as described above is not obtained.

For example, when a solid electrolyte does not contain Y, even if the initial total ion conductivity can be made relatively high, it is difficult to favorably maintain a high total ion conductivity even under the atmosphere.

Further, when a solid electrolyte does not contain the M, even if a decrease in the total ion conductivity in the case of being placed under the atmosphere can be suppressed, it is difficult to sufficiently increase the initial total ion conductivity itself.

Further, even if a solid electrolyte is a lithium lanthanum zirconate-based material containing Y and the M, when the content of Y in the solid electrolyte is too high, in other words, when the value of the z is too large, even if a decrease in the total ion conductivity in the case of being placed under the atmosphere can be suppressed, it is difficult to sufficiently increase the initial total ion conductivity itself.

Further, even if a solid electrolyte is a lithium lanthanum zirconate-based material containing Y and the M, when the content of the M in the solid electrolyte is too high, in other words, when the value of the x is too large, even if a decrease in the total ion conductivity in the case of being placed under the atmosphere can be suppressed, it is difficult to sufficiently increase the initial total ion conductivity itself.

Further, when a solid electrolyte contains only one type of element as the M, even if a decrease in the total ion conductivity in the case of being placed under the atmosphere can be suppressed, it is difficult to sufficiently increase the initial total ion conductivity itself.

As described above, in the compositional formula (1), x need only satisfy the condition: $0.00 < x < 1.10$, but preferably satisfies the condition: $0.10 \le x \le 1.00$, more preferably satisfies the condition: $0.15 \le x \le 0.90$, and further more preferably satisfies the condition: $0.20 \le x \le 0.80$.

According to this, the above-mentioned effect is more remarkably exhibited.

As described above, in the compositional formula (1), z need only satisfy the condition: $0.00 < z \le 0.15$, but preferably satisfies the condition: $0.01 \le z \le 0.13$, more preferably satisfies the condition: $0.02 \le z \le 0.10$, and further more preferably satisfies the condition: $0.03 \le z \le 0.07$.

According to this, the above-mentioned effect is more remarkably exhibited.

In the solid electrolyte, Li is mainly present at C site and an interstitial position in a garnet-type lithium ion conductor $Li_7La_3Zr_2O_{12}$ that is a basic structure, and contributes to the lithium ion conduction property.

In the solid electrolyte, La mainly constitutes a garnet-type lithium ion conductor $Li_7La_3Zr_2O_{12}$ that is a basic structure, and occupies A site as $La^{3+}$.

In the solid electrolyte, Zr mainly constitutes a garnet-type lithium ion conductor $Li_7La_3Zr_2O_{12}$ that is a basic structure, and occupies B site as $Zr^{4+}$.

In the solid electrolyte, the M mainly exhibits a function of lowering the tetragonal-cubic transition temperature and the melting point as compared with a case where the M is not contained, and imparting a high Li conduction property since an oxide of such M has a high permittivity.

Above all, when the M contains at least Nb, the tetragonal-cubic transition temperature and the melting point are lowered as compared with a case where Nb is not contained, and since an oxide of Nb has a high permittivity, an effect of imparting a high Li conduction property is obtained.

Further, when the M contains at least Ta, the tetragonal-cubic transition temperature and the melting point are lowered as compared with a case where Ta is not contained, and since an oxide of Ta has a high permittivity, a high Li conduction property is imparted, and further, since an oxide of Ta is hardly crystallized, the occurrence of a grain boundary is likely to be more effectively suppressed.

Further, when the M contains at least Sb, the tetragonal-cubic transition temperature and the melting point are lowered as compared with a case where Sb is not contained, and since an oxide of Sb has a high permittivity, an effect of imparting a high Li conduction property is obtained.

In particular, when the M contains a combination of Sb and Ta, Sb is present much in a crystal bulk, and also an oxide of Ta is hardly crystallized, and therefore, amorphization is caused at grain boundaries due to the presence of much Ta at grain boundaries, so that the electrolyte is in a state of being free from grain boundaries, and the generation of lithium dendrites is more effectively suppressed.

Further, when the M contains a combination of Nb and Ta, Nb is present much in a crystal bulk, and also an oxide of Ta is hardly crystallized, and therefore, amorphization is caused at grain boundaries due to the presence of much Ta at grain boundaries, so that the electrolyte is in a state of being free from grain boundaries, and the generation of lithium dendrites is more effectively suppressed.

When the M contains at least Nb, the ratio of Nb to the entire M is preferably 10 at % or more and 95 at % or less, more preferably 20 at % or more and 90 at % or less, and further more preferably 30 at % or more and 85 at % or less.

According to this, the tetragonal-cubic transition temperature and the melting point are lowered, and since an oxide of Nb has a high permittivity, an effect of imparting a high Li conduction property is more remarkably obtained.

When the M contains at least Ta, the ratio of Ta to the entire M is preferably 5 at % or more and 80 at % or less, more preferably 10 at % or more and 60 at % or less, and further more preferably 15 at % or more and 40 at % or less.

According to this, the tetragonal-cubic transition temperature and the melting point are lowered, and since an oxide of Ta has a high permittivity, a high Li conduction property is imparted, and further, since an oxide of Ta is hardly crystallized, the occurrence of a grain boundary is likely to be more effectively suppressed.

When the M contains at least Sb, the ratio of Sb to the entire M is preferably 5 at % or more and 85 at % or less, more preferably 10 at % or more and 80 at % or less, and further more preferably 15 at % or more and 75 at % or less.

According to this, the tetragonal-cubic transition temperature and the melting point are lowered, and since an oxide of Sb has a high permittivity, an effect of imparting a high Li conduction property is more remarkably obtained.

The solid electrolyte according to the present disclosure may contain another element in addition to the elements constituting the compositional formula (1), that is, an element other than Li, La, Y, Zr, Nb, Ta, Sb, and O as long as the amount thereof is a trace amount. As the another element, one type or two or more types may be used.

The content of the another element contained in the solid electrolyte according to the present disclosure is preferably 100 ppm or less, and more preferably 50 ppm or less.

When two or more types of elements are contained as the another element, the sum of the contents of these elements shall be adopted as the content of the another element.

The crystal phase of the solid electrolyte according to the present disclosure is generally a cubic garnet-type crystal.

The solid electrolyte according to the present disclosure may be, for example, used by itself or in combination with another component. More specifically, the solid electrolyte according to the present disclosure may be, for example, used as a substance that constitutes a solid electrolyte layer as described later in a battery by itself, or may be a substance that constitutes a solid electrolyte layer in a mixed state with another solid electrolyte. In addition, for example, the solid electrolyte according to the present disclosure may be a substance that constitutes a positive electrode layer in a mixed state with a positive electrode active material, or may be a substance that constitutes a negative electrode layer in a mixed state with a negative electrode active material.

[2] Method for Producing Solid Electrolyte

Next, a method for producing a solid electrolyte according to the present disclosure will be described.

The method for producing a solid electrolyte according to the present disclosure includes a mixing step of mixing multiple types of raw materials containing metal elements included in the compositional formula (1), thereby obtaining a mixture, a first heating step of subjecting the mixture to a first heating treatment thereby forming a calcined body, and a second heating step of subjecting the calcined body to a second heating treatment thereby forming a crystalline solid electrolyte represented by the compositional formula (1).

According to this, a method for producing a solid electrolyte capable of producing a solid electrolyte that can favorably maintain a high total ion conductivity even under the atmosphere can be provided. More specifically, a method for producing a solid electrolyte capable of producing a solid electrolyte, in which some of the lanthanum sites of a lithium lanthanum zirconate-based material are substituted with yttrium, whereby acid resistance is enhanced, and the generation of lithium carbonate caused by carbon dioxide can be suppressed, so that a high total ion conductivity is exhibited even under the atmosphere, can be provided.

[2-1] Mixing Step

In the mixing step, a mixture is obtained by mixing multiple types of raw materials containing metal elements included in the compositional formula (1).

In this step, two or more types of metal elements among the metal elements included in the compositional formula (1) need only be contained in the mixture obtained by mixing multiple types of raw materials as a whole.

Further, at least one type of the multiple types of raw materials to be used in this step may be an oxoacid compound containing an oxoanion together with a metal ion.

According to this, by a heat treatment at a relatively low temperature for a relatively short time, a solid electrolyte having a desired property can be stably formed. More specifically, by using an oxoacid compound in this step, a calcined body can be obtained as a material containing an oxide that is different from a solid electrolyte to be finally obtained and an oxoacid compound in the later step. As a result, the melting point of the oxide is lowered, and a close contact interface with an adherend can be formed while promoting the crystal growth in a firing treatment that is a heat treatment at a relatively low temperature for a relatively short time.

The oxoanion constituting the oxoacid compound does not contain a metal element, and for example, a halogen oxoacid, a borate ion, a carbonate ion, an orthocarbonate ion, a carboxylate ion, a silicate ion, a nitrite ion, a nitrate ion, a phosphite ion, a phosphate ion, an arsenate ion, a sulfite ion, a sulfate ion, a sulfonate ion, a sulfinate ion, and the like are exemplified. As the halogen oxoacid, for example, a hypochlorous ion, a chlorite ion, a chlorate ion, a perchlorate ion, a hypobromite ion, a bromite ion, a bromate ion, a perbromate ion, a hypoiodite ion, an iodite ion, an iodate ion, a periodate ion, and the like are exemplified. Above all, the oxoacid compound preferably contains at least one of a nitrate ion and a sulfate ion as the oxoanion, and more preferably contains a nitrate ion.

According to this, the melting point of the metal oxide contained in the calcined body obtained in the first heating step that will be described in detail later is more favorably lowered, and the crystal growth of a lithium-containing composite oxide can be more effectively promoted. As a result, even when the second heating step that will be described in detail later is performed at a lower temperature for a shorter time, a solid electrolyte having a particularly excellent ion conduction property can be favorably obtained. In the following description, a metal oxide contained in the calcined body obtained in the first heating step is also referred to as "precursor oxide".

As the raw materials containing metal elements, for example, a simple substance metal or an alloy may be used, or a compound in which a metal element contained in a molecule is only one type may be used, or a compound containing multiple types of metal elements in a molecule may be used.

As a lithium compound that is a raw material containing Li, for example, a lithium metal salt, a lithium alkoxide, and the like are exemplified, and it is possible to use one type or two or more types in combination among these. Examples of the lithium metal salt include lithium chloride, lithium nitrate, lithium sulfate, lithium acetate, lithium hydroxide, lithium carbonate, and (2,4-pentanedionato)lithium. Examples of the lithium alkoxide include lithium methoxide, lithium ethoxide, lithium propoxide, lithium isopropoxide, lithium butoxide, lithium isobutoxide, lithium sec-butoxide, lithium tert-butoxide, and dipivaloylmethanato lithium. Above all, the lithium compound is preferably one type or two or more types selected from the group consisting of lithium nitrate, lithium sulfate, and (2,4-pentanedionato) lithium. As the raw material containing Li, a hydrate may be used.

As a lanthanum compound that is a raw material containing La, for example, a lanthanum metal salt, a lanthanum alkoxide, lanthanum hydroxide, and the like are exemplified, and it is possible to use one type or two or more types in combination among these. Examples of the lanthanum metal salt include lanthanum chloride, lanthanum nitrate, lanthanum sulfate, lanthanum acetate, and tris(2,4-pentanedionato)lanthanum. Examples of the lanthanum alkoxide include lanthanum trimethoxide, lanthanum triethoxide, lanthanum tripropoxide, lanthanum triisopropoxide, lanthanum tributoxide, lanthanum triisobutoxide, lanthanum tri-sec-butoxide, lanthanum tri-tert-butoxide, and dipivaloylmethanato lanthanum. Above all, the lanthanum compound is preferably at least one type selected from the group consisting of lanthanum nitrate, tris(2,4-pentanedionato)lanthanum, and lanthanum hydroxide. As the raw material containing La, a hydrate may be used.

As an yttrium compound that is a raw material containing Y, for example, an yttrium metal salt, an yttrium alkoxide, yttrium hydroxide, and the like are exemplified, and it is possible to use one type or two or more types in combination among these. Examples of the yttrium metal salt include yttrium chloride, yttrium nitrate, yttrium sulfate, yttrium acetate, and tris(2,4-pentanedionato)yttrium. Examples of the yttrium alkoxide include yttrium trimethoxide, yttrium triethoxide, yttrium tripropoxide, yttrium triisopropoxide, yttrium tributoxide, yttrium triisobutoxide, yttrium tri-sec-butoxide, yttrium tri-tert-butoxide, and dipivaloylmethanato yttrium. Above all, the yttrium compound is preferably at least one type selected from the group consisting of yttrium nitrate, tris(2,4-pentanedionato)yttrium, and yttrium hydroxide. As the raw material containing Y, a hydrate may be used.

As a zirconium compound that is a raw material containing Zr, for example, a zirconium metal salt, a zirconium alkoxide, and the like are exemplified, and it is possible to use one type or two or more types in combination among these. Examples of the zirconium metal salt include zirconium chloride, zirconium oxychloride, zirconium oxynitrate, zirconium oxysulfate, zirconium oxyacetate, and zirconium acetate. Examples of the zirconium alkoxide include zirconium tetramethoxide, zirconium tetraethoxide, zirconium tetrapropoxide, zirconium tetraisopropoxide, zirconium tetra-n-butoxide, zirconium tetraisobutoxide, zirconium tetra-sec-butoxide, zirconium tetra-tert-butoxide, and dipivaloylmethanato zirconium. Above all, as the zirconium compound, zirconium tetra-n-butoxide is preferred. As the raw material containing Zr, a hydrate may be used.

As a niobium compound that is a raw material containing Nb, for example, a niobium metal salt, a niobium alkoxide, niobium acetylacetone, and the like are exemplified, and it is possible to use one type or two or more types in combination among these. Examples of the niobium metal salt include niobium chloride, niobium oxychloride, and niobium oxalate. Examples of the niobium alkoxide include niobium ethoxide such as niobium pentaethoxide, niobium propoxide, niobium isopropoxide, and niobium sec-butoxide. Above all, as the niobium compound, niobium pentaethoxide is preferred. As the raw material containing Nb, a hydrate may be used.

As a tantalum compound that is a raw material containing Ta, for example, a tantalum metal salt, a tantalum alkoxide, and the like are exemplified, and it is possible to use one type or two or more types in combination among these. Examples of the tantalum metal salt include tantalum chloride and tantalum bromide. Examples of the tantalum alkoxide include tantalum pentamethoxide, tantalum pentaethoxide, tantalum pentaisopropoxide, tantalum penta-n-propoxide, tantalum pentaisobutoxide, tantalum penta-n-butoxide, tantalum penta-sec-butoxide, and tantalum penta-tert-butoxide. Above all, as the tantalum compound, tantalum pentaethoxide is preferred. As the raw material containing Ta, a hydrate may be used.

As an antimony compound that is a raw material containing Sb, for example, an antimony metal salt, an antimony alkoxide, and the like are exemplified, and it is possible to use one type or two or more types in combination among these. Examples of the antimony metal salt include antimony bromide, antimony chloride, antimony fluoride, and antimony sulfate. Examples of the antimony alkoxide include antimony trimethoxide, antimony triethoxide, antimony triisopropoxide, antimony tri-n-propoxide, antimony triisobutoxide, and antimony tri-n-butoxide. Above all, as the antimony compound, antimony tri-n-butoxide is preferred. As the raw material containing Sb, a hydrate may be used.

In the preparation of the mixture, a solvent may be used.

According to this, the multiple types of raw materials containing metal elements included in the compositional formula (1) can be more favorably mixed.

The solvent is not particularly limited, and for example, various types of organic solvents can be used, however, more specifically, for example, an alcohol, a glycol, a ketone, an ester, an ether, an organic acid, an aromatic, an amide, and the like are exemplified, and one type or a mixed solvent that is a combination of two or more types selected from these can be used. Examples of the alcohol include methyl alcohol, ethyl alcohol, n-propyl alcohol, isopropyl alcohol, n-butyl alcohol, allyl alcohol, and 2-n-butoxyethanol. Examples of the glycol include ethylene glycol, propylene glycol, butylene glycol, hexylene glycol, pentanediol, hexanediol, heptanediol, and dipropylene glycol. Examples of the ketone include dimethyl ketone, methyl ethyl ketone, methyl propyl ketone, and methyl isobutyl ketone. Examples of the ester include methyl formate, ethyl formate, methyl acetate, and methyl acetoacetate. Examples of the ether include diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether. Examples of the organic acid include formic acid, acetic acid, 2-ethylbutyric acid, and propionic acid. Examples of the aromatic include toluene, o-xylene, and p-xylene. Examples of the amide include formamide, N,N-dimethylformamide, N,N-diethylformamide, dimethylacetamide, and N-methylpyrrolidone. Above all, the solvent is preferably at least one of 2-n-butoxyethanol and propionic acid.

When a solvent is used in the preparation of the mixture, the solvent may be at least partially removed prior to the first heating step that will be described in detail later.

The removal of the solvent prior to the first heating step can be performed by, for example, heating the mixture, placing the mixture in a reduced pressure atmosphere, or placing the mixture under normal temperature and normal pressure. By at least partially removing the solvent, the mixture can be favorably gelled. Note that the "normal temperature and normal pressure" as used herein refers to 25° C. and 1 atm.

Hereinafter, when the removal of the solvent is performed by a heating treatment, the heating treatment is also referred to as "preheating treatment".

The conditions of the preheating treatment depend on the boiling point or the vapor pressure of the solvent or the like, but the heating temperature in the preheating treatment is preferably 50° C. or higher and 250° C. or lower, more preferably 60° C. or higher and 230° C. or lower, and further more preferably 80° C. or higher and 200° C. or lower. During the preheating treatment, the heating temperature may be changed. For example, the preheating treatment may include a first stage in which a heat treatment is performed while maintaining a relatively low temperature, and a second stage in which the temperature is raised after the first stage, and a heat treatment at a relatively high temperature is performed. In such a case, it is preferred that the highest temperature in the preheating treatment falls within the above-mentioned range.

Further, the heating time in the preheating treatment is preferably 10 minutes or more and 180 minutes or less, more preferably 20 minutes or more and 120 minutes or less, and further more preferably 30 minutes or more and 60 minutes or less.

The preheating treatment may be performed in any atmosphere, and may be performed in an oxidizing atmosphere such as in the air or in an oxygen gas atmosphere, or may be performed in a non-oxidizing atmosphere of an inert gas such as nitrogen gas, helium gas, or argon gas, or the like. Further, the preheating treatment may be performed under reduced pressure or vacuum, or under pressure.

Further, during the preheating treatment, the atmosphere may be maintained under substantially the same conditions, or may be changed to different conditions. For example, the preheating treatment may include a first stage in which a heat treatment is performed in a normal pressure environment and a second stage in which a heat treatment is performed in a reduced pressure environment after the first stage.

[2-2] First Heating Step

In the first heating step, the mixture obtained in the mixing step, for example, the gelled mixture is subjected to a first heating treatment, thereby forming a calcined body.

In particular, when an oxoacid compound is used for part of the raw materials, a calcined body containing a precursor oxide that is an oxide different from the solid electrolyte to be finally obtained, and the oxoacid compound is obtained.

The heating temperature in the first heating step is not particularly limited, but is preferably 500° C. or higher and 650° C. or lower, more preferably 510° C. or higher and 650° C. or lower, and furthermore preferably 520° C. or higher and 600° C. or lower.

According to this, undesirable vaporization of metal elements to constitute the solid electrolyte to be finally obtained, particularly vaporization of Li that easily vaporizes among the metal materials, or the like can be more effectively prevented, and the formulation of the solid electrolyte to be finally obtained can be more strictly controlled, and also the solid electrolyte can be more efficiently produced.

During the first heating step, the heating temperature may be changed. For example, the first heating step may include a first stage in which a heat treatment is performed while maintaining a relatively low temperature, and a second stage in which the temperature is raised after the first stage, and a heat treatment at a relatively high temperature is performed. In such a case, it is preferred that the highest temperature in the first heating step falls within the above-mentioned range.

Further, the heating time in the first heating step, particularly the heating time when the heating temperature is 500° C. or higher and 650° C. or lower is preferably 5 minutes or more and 180 minutes or less, more preferably 10 minutes or more and 120 minutes or less, and further more preferably 15 minutes or more and 90 minutes or less.

The first heating step may be performed in any atmosphere, and may be performed in an oxidizing atmosphere such as in the air or in an oxygen gas atmosphere, or may be performed in a non-oxidizing atmosphere of an inert gas such as nitrogen gas, helium gas, or argon gas, or the like. Further, the first heating step may be performed under reduced pressure or vacuum, or under pressure. In particular, the first heating step is preferably performed in an oxidizing atmosphere.

Further, during the first heating step, the atmosphere may be maintained under substantially the same conditions, or may be changed to different conditions. For example, the first heating step may include a first stage in which a heat treatment is performed in an inert gas atmosphere and a second stage in which a heat treatment is performed in an oxidizing atmosphere after the first stage.

The calcined body obtained as described above generally contains a precursor oxide having a crystal phase which is different from that of the solid electrolyte to be finally obtained, that is, the solid electrolyte represented by the compositional formula (1) at normal temperature and normal pressure. In this specification, the "different" in terms of crystal phase is a broad concept not only including that the type of crystal phase is not the same, but also including that even if the type is the same, at least one lattice constant is different, or the like.

As the crystal phase of the precursor oxide, for example, cubic crystals such as a pyrochlore-type crystal, a perovskite structure, a rock salt-type structure, a diamond structure, a fluorite-type structure, and a spinel-type structure, orthorhombic crystals such as a ramsdellite type, a trigonal crystal such as a corundum type, and the like are exemplified, however, the crystal phase is preferably a pyrochlore-type crystal.

According to this, even when the conditions in the second heating step described later are set to a lower temperature and a shorter time, a solid electrolyte having a particularly excellent ion conduction property can be favorably obtained.

The crystal grain diameter of the precursor oxide is not particularly limited, but is preferably 10 nm or more and 200 nm or less, more preferably 15 nm or more and 180 nm or less, and further more preferably 20 nm or more and 160 nm or less.

According to this, due to a so-called Gibbs-Thomson effect that is a phenomenon of lowering the melting point with an increase in surface energy, the melting temperature of the precursor oxide or the firing temperature in the second heating step can be further lowered. Further, this is also advantageous to the improvement of joining of the solid electrolyte to be produced using the method according to the present disclosure to a heterogeneous material or the reduction of the defect density.

The precursor oxide is preferably constituted by a substantially single crystal phase.

According to this, the precursor oxide undergoes crystal phase transition substantially once when producing the solid electrolyte using the method according to the present disclosure, that is, when generating a high-temperature crystal phase, and therefore, segregation of elements accompanying the crystal phase transition or generation of a contaminant crystal by thermal decomposition is suppressed, so that various properties of the solid electrolyte to be produced are further improved.

In a case where only one exothermic peak is observed within a range of 300° C. or higher and 1,000° C. or lower when measurement is performed by TG-DTA at a temperature raising rate of 10° C./min for the calcined body obtained in the first heating step, it can be determined that "it is constituted by a substantially single crystal phase".

The formulation of the precursor oxide is not particularly limited, however, the precursor oxide is preferably a composite oxide. In particular, the precursor oxide is preferably a composite oxide containing La and Y.

According to this, even when a heat treatment in the second heating step described later is performed at a lower temperature for a shorter time, a solid electrolyte having a particularly excellent ion conduction property can be favorably obtained. In addition, for example, in an all-solid-state secondary battery, the adhesion of the solid electrolyte to be formed to a positive electrode active material or a negative electrode active material can be made more excellent, and a composite material can be formed so as to have a more favorable close contact interface, and thus, the properties and reliability of the all-solid-state secondary battery can be made more excellent.

Further, in the calcined body obtained as described above, generally, almost all the solvent used in the production process is removed, however, a portion of the solvent may remain. However, the content of the solvent in the calcined body is preferably 1.0 mass % or less, and more preferably 0.1 mass % or less.

[2-3] Second Heating Step

In the second heating step, the calcined body obtained in the first heating step is subjected to a second heating treatment, thereby forming a crystalline solid electrolyte represented by the compositional formula (1).

In particular, when the calcined body obtained in the first heating step contains an oxoacid compound, the melting point of the precursor oxide is favorably lowered, and the crystal growth of a lithium-containing composite oxide can be promoted, and by a heat treatment at a relatively low temperature for a relatively short time, a solid electrolyte having a desired property can be stably formed. In addition, the adhesion between the solid electrolyte to be formed and an adherend can be made favorable.

The second heating step may be performed after mixing another component in the calcined body described above.

For example, the second heating step may be performed for a mixture of the calcined body with an oxoacid compound.

Even in such a case, the same effect as described above is obtained.

Here, as a specific example of the oxoacid compound that can be mixed with the calcined body, the oxoacid compound contained in the metal compound exemplified as the raw material of the mixture described above, or the like is exemplified.

In the second heating step, the calcined body may be subjected to the heating step in a state of being mixed with an active material such as a positive electrode active material or a negative electrode active material.

According to this, an electrode such as a positive electrode or a negative electrode can be favorably produced in a state where the solid electrolyte is contained together with the active material. The positive electrode active material and the negative electrode active material will be described in detail later.

A composition to be subjected to the second heating step contains multiple types of metal elements as the constituent elements of the solid electrolyte as a whole, and generally, the ratio of the contents thereof corresponds to the content ratio of each metal element in the formulation of the target solid electrolyte, that is, the compositional formula (1).

When the composition to be subjected to this step contains an oxoacid compound, the content of the oxoacid compound in the composition is not particularly limited, but is preferably 0.1 mass % or more and 20 mass % or less, more preferably 1.5 mass % or more and 15 mass % or less, and further more preferably 2.0 mass % or more and 10 mass % or less.

According to this, a heat treatment in the second heating step can be favorably performed at a lower temperature for a shorter time while more reliably preventing the oxoacid compound from undesirably remaining in the solid electrolyte to be finally obtained, and the ion conduction property of the solid electrolyte to be obtained can be made particularly excellent.

The content of the precursor oxide in the composition to be subjected to this step is not particularly limited, but is preferably 35 mass % or more and 85 mass % or less, and more preferably 45 mass % or more and 90 mass % or less.

When the content of the precursor oxide in the composition to be subjected to this step is represented by XP [mass %] and the content of the oxoacid compound in the composition to be subjected to this step is represented by XO [mass %], it is preferred to satisfy a relationship: $0.013 \leq XO/XP \leq 0.58$, it is more preferred to satisfy a relationship: $0.023 \leq XO/XP \leq 0.34$, and it is further more preferred to satisfy a relationship: $0.03 \leq XO/XP \leq 0.19$.

According to this, a heat treatment in the second heating step can be favorably performed at a lower temperature for a shorter time while more reliably preventing the oxoacid compound from undesirably remaining in the solid electrolyte to be finally obtained, and the ion conduction property of the solid electrolyte to be obtained can be made particularly excellent.

The heating temperature in the second heating step is not particularly limited, but is generally a higher temperature than the heating temperature in the first heating step, and is preferably 800° C. or higher and 1000° C. or lower, more preferably 810° C. or higher and 980° C. or lower, and further more preferably 820° C. or higher and 950° C. or lower.

According to this, by a heat treatment at a relatively low temperature for a relatively short time, a solid electrolyte having a desired property can be stably formed. Further, since a solid electrolyte can be produced by a heat treatment at a relatively low temperature for a relatively short time, for example, the productivity of the solid electrolyte or an all-solid-state battery including the solid electrolyte can be made more excellent, and also from the viewpoint of energy saving, such a heat treatment is preferred.

During the second heating step, the heating temperature may be changed. For example, the second heating step may include a first stage in which a heat treatment is performed while maintaining a relatively low temperature, and a second stage in which the temperature is raised after the first stage, and a heat treatment at a relatively high temperature is performed. In such a case, it is preferred that the highest temperature in the second heating step falls within the above-mentioned range.

The heating time in the second heating step, particularly the heating time when the heating temperature is 800° C. or higher and 1000° C. or lower is not particularly limited, but is preferably 5 minutes or more and 600 minutes or less, more preferably 10 minutes or more and 540 minutes or less, and further more preferably 15 minutes or more and 500 minutes or less.

According to this, by a heat treatment at a relatively low temperature for a relatively short time, a solid electrolyte having a desired property can be stably formed. Further, since the solid electrolyte can be produced by a heat treatment at a relatively low temperature for a relatively short time, for example, the productivity of the solid electrolyte or an all-solid-state battery including the solid electrolyte can be made more excellent, and also from the viewpoint of energy saving, such a heat treatment is preferred.

The second heating step may be performed in any atmosphere, and may be performed in an oxidizing atmosphere such as in the air or in an oxygen gas atmosphere, or may be performed in a non-oxidizing atmosphere of an inert gas such as nitrogen gas, helium gas, or argon gas, or the like. Further, the heating step may be performed under reduced pressure or vacuum, or under pressure. In particular, the second heating step is preferably performed in an oxidizing atmosphere.

Further, during the second heating step, the atmosphere may be maintained under substantially the same conditions, or may be changed to different conditions.

Even when the oxoacid compound is used as a raw material, the solid electrolyte obtained as described above generally does not substantially contain the oxoacid compound. More specifically, the content of the oxoacid compound in the solid electrolyte to be obtained is generally 100 ppm or less, and particularly, it is preferably 50 ppm or less, and more preferably 10 ppm or less.

According to this, the content of an undesirable impurity in the solid electrolyte can be suppressed, and the properties and reliability of the solid electrolyte can be made more excellent.

[3] Composite Body

Next, a composite body according to the present disclosure will be described.

The composite body according to the present disclosure includes an active material and the solid electrolyte according to the present disclosure that coats a part of a surface of the active material.

According to this, a composite body capable of favorably maintaining a high total ion conductivity even under the atmosphere can be provided. Further, a composite body having a sufficiently low grain boundary resistance between the active material and the solid electrolyte can be provided. Such a composite body can be favorably applied to a positive electrode composite material or a negative electrode composite material of a secondary battery as described later. As a result, the properties and reliability of the secondary battery as a whole can be made excellent.

Examples of the active material constituting the composite body according to the present disclosure include a positive electrode active material and a negative electrode active material.

As the positive electrode active material, for example, a lithium composite oxide which contains at least Li and is constituted by any one or more types of elements selected from the group consisting of V, Cr, Mn, Fe, Co, Ni, and Cu, or the like can be used. Examples of such a composite oxide include $LiCoO_2$, $LiNiO_2$, $LiMn_2O_4$, $Li_2Mn_2O_3$, $LiCr_{0.5}Mn_{0.5}O_2$, $LiFePO_4$, $Li_2FeP_2O_7$, $LiMnPO_4$, $LiFeBO_3$, $Li_3V_2(PO_4)_3$, $Li_2CuO_2$, $Li_2FeSiO_4$, and $Li_2MnSiO_4$. Further, as the positive electrode active material, for example, a fluoride such as $LiFeF_3$, a boride complex compound such as $LiBH_4$ or $Li_4BN_3H_{10}$, an iodine complex compound such as a polyvinylpyridine-iodine complex, a nonmetallic compound such as sulfur, or the like can also be used.

Examples of the negative electrode active material include $Nb_2O_5$, $V_2O_5$, $TiO_2$, $In_2O_3$, $ZnO$, $SnO_2$, $NiO$, ITO, AZO, GZO, ATO, FTO, and lithium composite oxides such as $Li_4Ti_5O_{12}$ and $Li_2Ti_3O_7$. Further, additional examples thereof include metals and alloys such as Li, Al, Si, Si—Mn, Si—Co, Si—Ni, Sn, Zn, Sb, Bi, In, and Au, carbon materials, and materials obtained by intercalation of lithium ions between layers of a carbon material such as $LiC_{24}$ and $LiC_6$.

The composite body according to the present disclosure can be favorably produced by, for example, applying the method for producing a solid electrolyte described in the above [2]. More specifically, for example, the composite body can be favorably produced by firing the mixture of the calcined body and the active material described above, that is, by subjecting the mixture to the second heating treatment.

[4] Secondary Battery

Next, a secondary battery to which the present disclosure is applied will be described.

A secondary battery according to the present disclosure includes the solid electrolyte according to the present disclosure as described above, and can be produced by, for example, applying the method for producing a solid electrolyte according to the present disclosure described above.

Such a secondary battery has excellent charge-discharge characteristics.

[4-1] Secondary Battery of First Embodiment

Hereinafter, a secondary battery according to a first embodiment will be described.

FIG. 1 is a schematic perspective view schematically showing a configuration of a lithium-ion battery as the secondary battery of the first embodiment.

As shown in FIG. 1, a lithium-ion battery 100 as the secondary battery includes a positive electrode 10, and a solid electrolyte layer 20 and a negative electrode 30, which are sequentially stacked on the positive electrode 10. The lithium-ion battery further includes a current collector 41 in contact with the positive electrode 10 at an opposite face side of the positive electrode 10 from a face thereof facing the solid electrolyte layer 20, and includes a current collector 42 in contact with the negative electrode 30 at an opposite face side of the negative electrode 30 from a face thereof facing the solid electrolyte layer 20. The positive electrode 10, the solid electrolyte layer 20, and the negative electrode 30 are all constituted by a solid phase, and therefore, the lithium-ion battery 100 is a chargeable and dischargeable all solid-state secondary battery.

The shape of the lithium-ion battery 100 is not particularly limited, and may be, for example, a polygonal disk shape or the like, but is a circular disk shape in the configuration shown in the drawing. The size of the lithium-ion battery 100 is not particularly limited, but for example, the diameter of the lithium-ion battery 100 is, for example, 10 mm or more and 20 mm or less, and the thickness of the lithium-ion battery 100 is, for example, 0.1 mm or more and 1.0 mm or less.

When the lithium-ion battery 100 is small and thin in this manner, together with the fact that it is chargeable and dischargeable and is an all solid-state battery, it can be favorably used as a power supply of a portable information terminal such as a smartphone. The lithium-ion battery 100 may be used for a purpose other than the power supply of a portable information terminal as described later.

Hereinafter, the respective configurations of the lithium-ion battery 100 will be described.

[4-1-1] Solid Electrolyte Layer

The solid electrolyte layer 20 is constituted by a material including the solid electrolyte according to the present disclosure described above.

According to this, the ion conductivity of the solid electrolyte layer 20 becomes excellent. Further, the adhesion of the solid electrolyte layer 20 to the positive electrode 10 or the negative electrode 30 can be made excellent. As a result, the properties and reliability of the lithium-ion battery 100 as a whole can be made particularly excellent.

The solid electrolyte layer 20 may contain a component other than the solid electrolyte according to the present disclosure described above. For example, the solid electrolyte layer 20 may contain another solid electrolyte together with the solid electrolyte according to the present disclosure described above.

However, the content of the solid electrolyte according to the present disclosure in the solid electrolyte layer 20 is preferably 80 mass % or more, more preferably 90 mass % or more, and further more preferably 95 mass % or more.

According to this, the effect of the present disclosure as described above is more remarkably exhibited.

The thickness of the solid electrolyte layer 20 is not particularly limited, but is preferably 0.3 μm or more and 1000 μm or less, and more preferably 0.5 μm or more and 100 μm or less from the viewpoint of charge-discharge rate.

Further, from the viewpoint of preventing a short circuit between the positive electrode 10 and the negative electrode 30 due to a lithium dendritic crystal body deposited at the negative electrode 30 side, a value obtained by dividing the measured weight of the solid electrolyte layer 20 by a value obtained by multiplying the apparent volume of the solid electrolyte layer 20 by the theoretical density of the solid electrolyte material, that is, the sintered density is preferably set to 50% or more, and more preferably set to 90% or more.

As a method for forming the solid electrolyte layer 20, for example, a green sheet method, a press firing method, a cast firing method, or the like is exemplified. A specific example of the method for forming the solid electrolyte layer 20 will be described in detail later. For the purpose of improving the adhesion of the solid electrolyte layer 20 to the positive electrode 10 and the negative electrode 30, or improving the output or battery capacity of the lithium-ion battery 100 by an increase in specific surface area, or the like, for example, a three-dimensional pattern structure such as a dimple, trench, or pillar pattern may be formed at a surface of the solid electrolyte layer 20 to come in contact with the positive electrode 10 or the negative electrode 30.

[4-1-2] Positive Electrode

The positive electrode 10 may be any as long as it is constituted by a positive electrode active material that can repeat electrochemical occlusion and release of lithium ions.

Specifically, as the positive electrode active material constituting the positive electrode 10, for example, a lithium composite oxide which contains at least Li and is constituted by any one or more types of elements selected from the group consisting of V, Cr, Mn, Fe, Co, Ni, and Cu, or the like can be used. Examples of such a composite oxide include $LiCoO_2$, $LiNiO_2$, $LiMn_2O_4$, $Li_2Mn_2O_3$, $LiCr_{0.5}Mn_{0.5}O_2$, $LiFePO_4$, $Li_2FeP_2O_7$, $LiMnPO_4$, $LiFeBO_3$, $Li_3V_2(PO_4)_3$, $Li_2CuO_2$, $Li_2FeSiO_4$, and $Li_2MnSiO_4$. Further, as the positive electrode active material constituting the positive electrode 10, for example, a fluoride such as $LiFeF_3$, a boride complex compound such as $LiBH_4$ or $Li_4BN_3H_{10}$, an iodine complex compound such as a polyvinylpyridine-iodine complex, a nonmetallic compound such as sulfur, or the like can also be used.

The positive electrode 10 is preferably formed as a thin film at one surface of the solid electrolyte layer 20 in consideration of an electric conduction property and an ion diffusion distance.

The thickness of the positive electrode 10 formed of the thin film is not particularly limited, but is preferably 0.1 μm or more and 500 μm or less, and more preferably 0.3 μm or more and 100 μm or less.

As a method for forming the positive electrode 10, for example, a vapor phase deposition method such as a vacuum vapor deposition method, a sputtering method, a CVD method, a PLD method, an ALD method, or an aerosol deposition method, a chemical deposition method using a solution such as a sol-gel method or an MOD method, or the like is exemplified. In addition, for example, fine particles of the positive electrode active material are formed into a slurry together with an appropriate binder, followed by squeegeeing or screen printing, thereby forming a coating film, and then, the coating film may be baked onto the surface of the solid electrolyte layer 20 by drying and firing.

[4-1-3] Negative Electrode

The negative electrode 30 may be any as long as it is constituted by a so-called negative electrode active material that repeats electrochemical occlusion and release of lithium ions at a lower potential than the material selected as the positive electrode 10.

Specifically, examples of the negative electrode active material constituting the negative electrode 30 include $Nb_2O_5$, $V_2O_5$, $TiO_2$, $In_2O_3$, $ZnO$, $SnO_2$, $NiO$, ITO, AZO, GZO, ATO, FTO, and lithium composite oxides such as $Li_4Ti_5O_{12}$ and $Li_2Ti_3O_7$. Further, additional examples thereof include metals and alloys such as Li, Al, Si, Si—Mn, Si—Co, Si—Ni, Sn, Zn, Sb, Bi, In, and Au, carbon materials, and materials obtained by intercalation of lithium ions between layers of a carbon material such as $LiC_{24}$ and $LiC_6$.

The negative electrode 30 is preferably formed as a thin film at one surface of the solid electrolyte layer 20 in consideration of an electric conduction property and an ion diffusion distance.

The thickness of the negative electrode 30 formed of the thin film is not particularly limited, but is preferably 0.1 μm or more and 500 μm or less, and more preferably 0.3 μm or more and 100 μm or less.

As a method for forming the negative electrode 30, for example, a vapor phase deposition method such as a vacuum vapor deposition method, a sputtering method, a CVD method, a PLD method, an ALD method, or an aerosol deposition method, a chemical deposition method using a solution such as a sol-gel method or an MOD method, or the like is exemplified. In addition, for example, fine particles of the negative electrode active material are formed into a slurry together with an appropriate binder, followed by squeegeeing or screen printing, thereby forming a coating film, and then, the coating film may be baked onto the surface of the solid electrolyte layer 20 by drying and firing.

[4-1-4] Current Collector

The current collectors 41 and 42 are electric conductors provided so as to play a role in transfer of electrons to the positive electrode 10 or the negative electrode 30. As the current collector, generally, a current collector constituted by a material that has a sufficiently small electrical resistance, and that does not substantially change the electric conduction property or the mechanical structure thereof by charging and discharging is used. Specifically, as the constituent material of the current collector 41 of the positive electrode 10, for example, Al, Ti, Pt, Au, or the like is used. Further, as the constituent material of the current collector 42 of the negative electrode 30, for example, Cu or the like is favorably used.

The current collectors 41 and 42 are generally provided so that the contact resistance with the positive electrode 10 and the negative electrode 30 becomes small, respectively. Examples of the shape of each of the current collectors 41 and 42 include a plate shape and a mesh shape.

The thickness of each of the current collectors 41 and 42 is not particularly limited, but is preferably 7 µm or more and 85 µm or less, and more preferably 10 µm or more and 60 µm or less.

In the configuration shown in the drawing, the lithium-ion battery 100 includes a pair of current collectors 41 and 42, however, for example, when a plurality of lithium-ion batteries 100 are used by being stacked and electrically coupled to one another in series, the lithium-ion battery 100 may also be configured to include only the current collector 41 of the current collectors 41 and 42.

The lithium-ion battery 100 may be used for any purpose. Examples of an electronic device to which the lithium-ion battery 100 is applied as a power supply include a personal computer, a digital camera, a cellular phone, a smartphone, a music player, a tablet terminal, a timepiece, a smartwatch, various types of printers such as an inkjet printer, a television, a projector, wearable terminals such as a head-up display, wireless headphones, wireless earphones, smart glasses, and a head-mounted display, a video camera, a videotape recorder, a car navigation device, a drive recorder, a pager, an electronic notebook, an electronic dictionary, an electronic translation machine, an electronic calculator, an electronic gaming device, a toy, a word processor, a work station, a robot, a television telephone, a television monitor for crime prevention, electronic binoculars, a POS terminal, a medical device, a fish finder, various types of measurement devices, a device for mobile terminal base stations, various types of meters for vehicles, railroad cars, airplanes, helicopters, ships, or the like, a flight simulator, and a network server. Further, the lithium-ion battery 100 may be applied to, for example, moving objects such as a car and a ship. More specifically, it can be favorably applied as, for example, a storage battery for electric cars, plug-in hybrid cars, hybrid cars, fuel cell cars, or the like. In addition, it can also be applied to, for example, a power supply for household use, a power supply for industrial use, a storage battery for photovoltaic power generation, or the like.

[4-2] Secondary Battery of Second Embodiment

Next, a secondary battery according to a second embodiment will be described.

Figure 2:
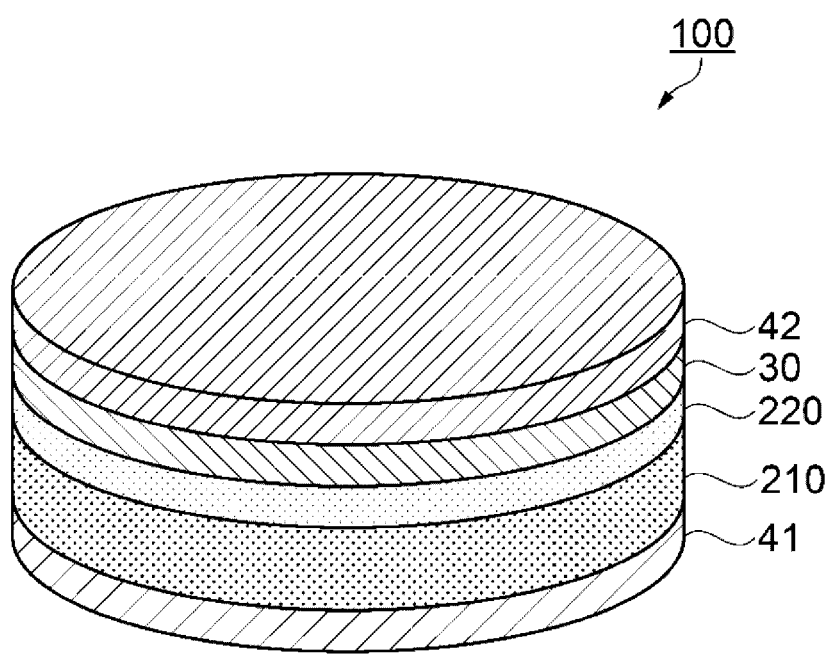
FIG. 2 is a schematic perspective view schematically showing a configuration of a lithium-ion battery as a secondary battery of a second embodiment.
Figure 3:
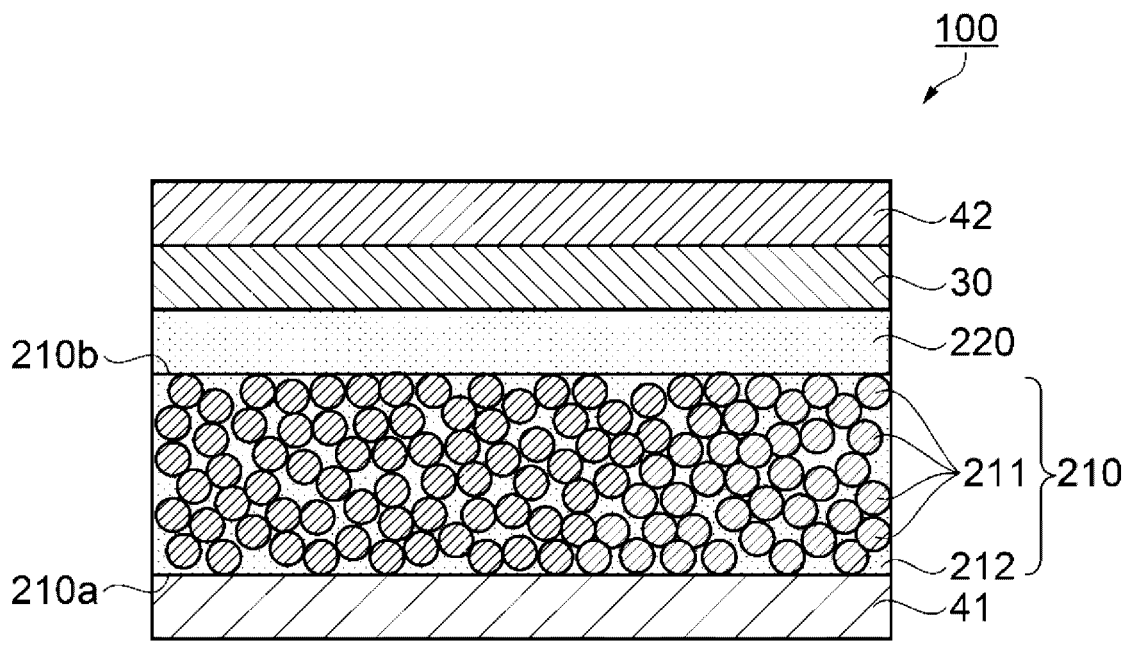
FIG. 3 is a schematic cross-sectional view schematically showing a structure of the lithium-ion battery as the secondary battery of the second embodiment.

FIG. 2 is a schematic perspective view schematically showing a configuration of a lithium-ion battery as the secondary battery of the second embodiment, and FIG. 3 is a schematic cross-sectional view schematically showing a structure of the lithium-ion battery as the secondary battery of the second embodiment.

Hereinafter, the secondary battery according to the second embodiment will be described with reference to these drawings, but different points from the above-mentioned embodiment will be mainly described, and the description of the same matter will be omitted.

As shown in FIG. 2, a lithium-ion battery 100 as the secondary battery of this embodiment includes a positive electrode composite material 210 that functions as a positive electrode, and an electrolyte layer 220 and a negative electrode 30, which are sequentially stacked on the positive electrode composite material 210. The lithium-ion battery further includes a current collector 41 in contact with the positive electrode composite material 210 at an opposite face side of the positive electrode composite material 210 from a face thereof facing the electrolyte layer 220, and includes a current collector 42 in contact with the negative electrode 30 at an opposite face side of the negative electrode 30 from a face thereof facing the electrolyte layer 220.

Hereinafter, the positive electrode composite material 210 and the electrolyte layer 220 which are different from the configuration of the lithium-ion battery 100 according to the above-mentioned embodiment will be described.

[4-2-1] Positive Electrode Composite Material

As shown in FIG. 3, the positive electrode composite material 210 in the lithium-ion battery 100 of this embodiment includes a positive electrode active material 211 in a particulate shape and a solid electrolyte 212. In such a positive electrode composite material 210, the battery reaction rate in the lithium-ion battery 100 can be further increased by increasing an interfacial area where the positive electrode active material 211 in a particulate shape and the solid electrolyte 212 are in contact with each other.

The average particle diameter of the positive electrode active material 211 is not particularly limited, but is preferably 0.1 µm or more and 150 µm or less, and more preferably 0.3 µm or more and 60 µm or less.

According to this, it becomes easy to achieve both an actual capacity density close to the theoretical capacity of the positive electrode active material 211 and a high charge-discharge rate.

Note that in this specification, the average particle diameter refers to a volume-based average particle diameter, and can be determined by, for example, subjecting a dispersion liquid prepared by adding a sample to methanol and dispersing the sample for 3 minutes using an ultrasonic disperser to measurement with a particle size distribution analyzer according to the Coulter counter method (model TA-II, manufactured by Coulter Electronics, Inc.) using an aperture of 50 µm.

The particle size distribution of the positive electrode active material 211 is not particularly limited, and for example, in the particle size distribution having one peak, the half width of the peak can be set to 0.15 µm or more and 19 µm or less. Further, the particle size distribution of the positive electrode active material 211 may have two or more peaks.

In FIG. 3, the shape of the positive electrode active material 211 in a particulate shape is shown as a spherical shape, however, the shape of the positive electrode active material 211 is not limited to the spherical shape, and it can have various shapes, for example, a columnar shape, a plate shape, a scaly shape, a hollow shape, an indefinite shape, and the like, and further, two or more types among these may be mixed.

Examples of the positive electrode active material 211 include the same materials as exemplified as the constituent material of the positive electrode 10 in the above-mentioned first embodiment.

In the positive electrode active material 211, for example, a coating layer may be formed at a surface for the purpose of reducing the interface resistance between the positive electrode active material 211 and the solid electrolyte 212, or improving an electron conduction property, or the like. For example, by forming a thin film of $LiNbO_3$, $Al_2O_3$, $ZrO_2$, $Ta_2O_5$, or the like at a surface of a particle of the positive electrode active material 211 composed of $LiCoO_2$, the interface resistance of lithium ion conduction can be further reduced. The thickness of the coating layer is not particularly limited, but is preferably 3 nm or more and 1 μm or less.

In this embodiment, the positive electrode composite material 210 includes the solid electrolyte 212 in addition to the positive electrode active material 211 described above. The solid electrolyte 212 is present so as to fill up a gap between particles of the positive electrode active material 211 or so as to be in contact with, particularly in close contact with the surface of the positive electrode active material 211.

The solid electrolyte 212 is constituted by a material including the solid electrolyte according to the present disclosure described above.

According to this, the ion conductivity of the solid electrolyte 212 becomes particularly excellent. Further, the adhesion of the solid electrolyte 212 to the positive electrode active material 211 or the electrolyte layer 220 becomes excellent. Accordingly, the properties and reliability of the lithium-ion battery 100 as a whole can be made particularly excellent.

When the content of the positive electrode active material 211 in the positive electrode composite material 210 is represented by XA [mass %] and the content of the solid electrolyte 212 in the positive electrode composite material 210 is represented by XS [mass %], it is preferred to satisfy a relationship: $0.1 \leq XS/XA \leq 8.3$, it is more preferred to satisfy a relationship: $0.3 \leq XS/XA \leq 2.8$, and it is further more preferred to satisfy a relationship: $0.6 \leq XS/XA \leq 1.4$.

Further, the positive electrode composite material 210 may include an electric conduction assistant, a binder, or the like other than the positive electrode active material 211 and the solid electrolyte 212.

However, the content of the component other than the positive electrode active material 211 and the solid electrolyte 212 in the positive electrode composite material 210 is preferably 10 mass % or less, more preferably 7 mass % or less, and further more preferably 5 mass % or less.

As the electric conduction assistant, any material may be used as long as it is an electric conductor whose electrochemical interaction can be ignored at a positive electrode reaction potential, and more specifically, for example, a carbon material such as acetylene black, Ketjen black, or a carbon nanotube, a noble metal such as palladium or platinum, an electric conductive oxide such as $SnO_2$, ZnO, $RuO_2$, $ReO_3$, or $Ir_2O_3$, or the like can be used.

The thickness of the positive electrode composite material 210 is not particularly limited, but is preferably 0.1 μm or more and 500 μm or less, and more preferably 0.3 μm or more and 100 μm or less.

[4-2-2] Electrolyte Layer

The electrolyte layer 220 is preferably constituted by the same material or the same type of material as the solid electrolyte 212 from the viewpoint of an interfacial impedance between the electrolyte layer 220 and the positive electrode composite material 210, but may be constituted by a material different from the solid electrolyte 212. For example, the electrolyte layer 220 contains the solid electrolyte according to the present disclosure described above, but may be constituted by a material having a different formulation from the solid electrolyte 212. Further, the electrolyte layer 220 may be a crystalline material or an amorphous material of another oxide solid electrolyte which is not the solid electrolyte according to the present disclosure, a sulfide solid electrolyte, a nitride solid electrolyte, a halide solid electrolyte, a hydride solid electrolyte, a dry polymer constituted by a material in which two or more types selected from these are combined.

When the electrolyte layer 220 is constituted by a material containing the solid electrolyte according to the present disclosure, the content of the solid electrolyte according to the present disclosure in the electrolyte layer 220 is preferably 80 mass % or more, more preferably 90 mass % or more, and further more preferably 95 mass % or more.

According to this, the effect of the present disclosure as described above is more remarkably exhibited.

Examples of a crystalline oxide include $Li_{0.35}La_{0.55}TiO_3$, $Li_{0.2}La_{0.27}NbO_3$, and a perovskite-type crystal or a perovskite-like crystal in which the elements constituting a crystal thereof are partially substituted with N, F, Al, Sr, Sc, Nb, Ta, Sb, a lanthanoid element, or the like, $Li_7La_3Zr_2O_{12}$, $Li_5La_3Nb_2O_{12}$, $Li_5BaLa_2TaO_{12}$, and a garnet-type crystal or a garnet-like crystal in which the elements constituting a crystal thereof are partially substituted with N, F, Al, Sr, Sc, Nb, Ta, Sb, a lanthanoid element, or the like, $Li_{1.3}Ti_{1.7}Al_{0.3}(PO_4)_3$, $Li_{1.4}Al_{0.4}Ti_{1.6}(PO_4)_3$, $Li_{1.4}Al_{0.4}Ti_{1.4}Ge_{0.2}(PO_4)_3$, and a NASICON-type crystal in which the elements constituting a crystal thereof are partially substituted with N, F, Al, Sr, Sc, Nb, Ta, Sb, a lanthanoid element, or the like, a LISICON-type crystal such as $Li_{14}ZnGe_4O_{16}$, and other crystalline materials such as $Li_{3.4}V_{0.6}Si_{0.4}O_4$, $Li_{3.6}V_{0.4}Ge_{0.6}O_4$, and $Li_{2+x}C_{1-x}B_xO_3$.

Examples of a crystalline sulfide include $Li_{10}GeP_2S_{12}$, $Li_{9.6}P_3S_{12}$, $Li_{9.54}Si_{1.74}P_{1.44}S_{11.7}Cl_{0.3}$, and $Li_3PS_4$.

Examples of other amorphous materials include $Li_2O$—$TiO_2$, $La_2O_3$—$Li_2O$—$TiO_2$, $LiNbO_3$, $LiSO_4$, $Li_4SiO_4$, $Li_3PO_4$—$Li_4SiO_4$, $Li_4GeO_4$—$Li_3VO_4$, $Li_4SiO_4$—$Li_3VO_4$, $Li_4GeO_4$—$Zn_2GeO_2$, $Li_4SiO_4$—$LiMoO_4$, $Li_4SiO_4$—$Li_4ZrO_4$, $SiO_2$—$P_2O_5$—$Li_2O$, $SiO_2$—$P_2O_5$—$LiCl$, $Li_2O$—$LiCl$—$B_2O_3$, $LiAlCl_4$, $LiAlF_4$, $LiF$—$Al_2O_3$, $LiBr$—$Al_2O_3$, $Li_{2.88}PO_{3.73}N_{0.14}$, $Li_3N$—$LiCl$, $Li_6NBr_3$, $Li_2S$—$SiS_2$, and $Li_2S$—$SiS_2$—$P_2S_5$.

When the electrolyte layer 220 is constituted by a crystalline material, the crystalline material preferably has a crystal structure such as a cubic crystal having small crystal plane anisotropy in the direction of lithium ion conduction. Further, when the electrolyte layer 220 is constituted by an amorphous material, the anisotropy in lithium ion conduction becomes small. Therefore, the crystalline material and the amorphous material as described above are both preferred as a solid electrolyte constituting the electrolyte layer 220.

The thickness of the electrolyte layer 220 is preferably 0.1 μm or more and 100 μm or less, and more preferably 0.2 μm or more and 10 μm or less. When the thickness of the electrolyte layer 220 is a value within the above range, the internal resistance of the electrolyte layer 220 can be further decreased, and also the occurrence of a short circuit between the positive electrode composite material 210 and the negative electrode 30 can be more effectively prevented.

For the purpose of improving the adhesion between the electrolyte layer 220 and the negative electrode 30, or improving the output or battery capacity of the lithium-ion battery 100 by an increase in specific surface area, or the like, for example, a three-dimensional pattern structure such as a dimple, trench, or pillar pattern may be formed at a surface of the electrolyte layer 220 to come in contact with the negative electrode 30.

[4-3] Secondary Battery of Third Embodiment

Next, a secondary battery according to a third embodiment will be described.

Figure 4:
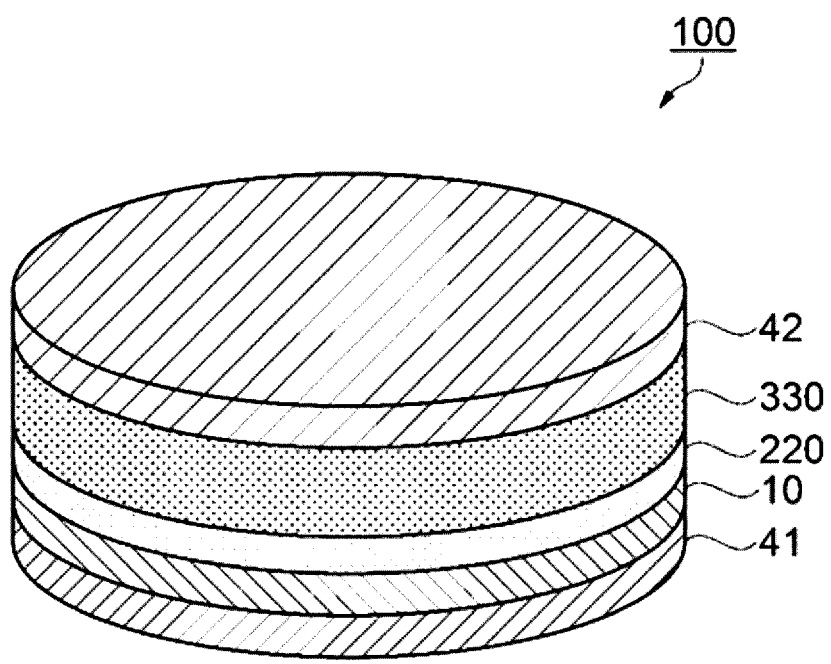
FIG. 4 is a schematic perspective view schematically showing a configuration of a lithium-ion battery as a secondary battery of a third embodiment.
Figure 5:
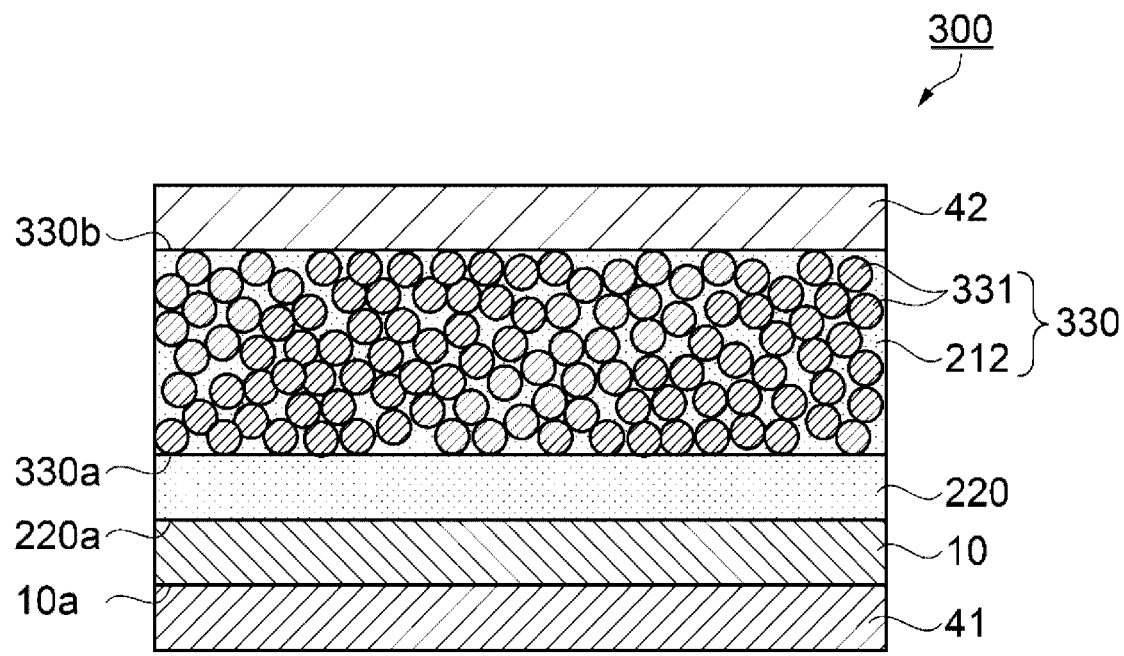
FIG. 5 is a schematic cross-sectional view schematically showing a structure of the lithium-ion battery as the secondary battery of the third embodiment.

FIG. 4 is a schematic perspective view schematically showing a configuration of a lithium-ion battery as the secondary battery of the third embodiment, and FIG. 5 is a schematic cross-sectional view schematically showing a structure of the lithium-ion battery as the secondary battery of the third embodiment.

Hereinafter, the secondary battery according to the third embodiment will be described with reference to these drawings, but different points from the above-mentioned embodiments will be mainly described, and the description of the same matter will be omitted.

As shown in FIG. 4, a lithium-ion battery 100 as the secondary battery of this embodiment includes a positive electrode 10, and an electrolyte layer 220 and a negative electrode composite material 330 that functions as a negative electrode, which are sequentially stacked on the positive electrode 10. The lithium-ion battery further includes a current collector 41 in contact with the positive electrode 10 at an opposite face side of the positive electrode 10 from a face thereof facing the electrolyte layer 220, and includes a current collector 42 in contact with the negative electrode composite material 330 at an opposite face side of the negative electrode composite material 330 from a face thereof facing the electrolyte layer 220.

Hereinafter, the negative electrode composite material 330 which is different from the configuration of the lithium-ion battery 100 according to the above-mentioned embodiments will be described.

[4-3-1] Negative Electrode Composite Material

As shown in FIG. 5, the negative electrode composite material 330 in the lithium-ion battery 100 of this embodiment includes a negative electrode active material 331 in a particulate shape and a solid electrolyte 212. In such a negative electrode composite material 330, the battery reaction rate in the lithium-ion battery 100 can be further increased by increasing an interfacial area where the negative electrode active material 331 in a particulate shape and the solid electrolyte 212 are in contact with each other.

The average particle diameter of the negative electrode active material 331 is not particularly limited, but is preferably 0.1 μm or more and 150 μm or less, and more preferably 0.3 μm or more and 60 μm or less.

According to this, it becomes easy to achieve both an actual capacity density close to the theoretical capacity of the negative electrode active material 331 and a high charge-discharge rate.

The particle size distribution of the negative electrode active material 331 is not particularly limited, and for example, in the particle size distribution having one peak, the half width of the peak can be set to 0.1 μm or more and 18 μm or less. Further, the particle size distribution of the negative electrode active material 331 may have two or more peaks.

In FIG. 5, the shape of the negative electrode active material 331 in a particulate shape is shown as a spherical shape, however, the shape of the negative electrode active material 331 is not limited to the spherical shape, and it can have various shapes, for example, a columnar shape, a plate shape, a scaly shape, a hollow shape, an indefinite shape, and the like, and further, two or more types among these may be mixed.

Examples of the negative electrode active material 331 include the same materials as exemplified as the constituent material of the negative electrode 30 in the above-mentioned first embodiment.

In this embodiment, the negative electrode composite material 330 includes the solid electrolyte 212 in addition to the negative electrode active material 331 described above. The solid electrolyte 212 is present so as to fill up a gap between particles of the negative electrode active material 331 or so as to be in contact with, particularly in close contact with the surface of the negative electrode active material 331.

The solid electrolyte 212 is constituted by a material including the solid electrolyte according to the present disclosure described above.

According to this, the ion conductivity of the solid electrolyte 212 becomes particularly excellent. Further, the adhesion of the solid electrolyte 212 to the negative electrode active material 331 or the electrolyte layer 220 can be made excellent. Accordingly, the properties and reliability of the lithium-ion battery 100 as a whole can be made particularly excellent.

When the content of the negative electrode active material 331 in the negative electrode composite material 330 is represented by XB [mass %] and the content of the solid electrolyte 212 in the negative electrode composite material 330 is represented by XS [mass %], it is preferred to satisfy a relationship: $0.14 \leq XS/XB \leq 26$, it is more preferred to satisfy a relationship: $0.44 \leq XS/XB \leq 4.1$, and it is further more preferred to satisfy a relationship: $0.89 \leq XS/XB \leq 2.1$.

Further, the negative electrode composite material 330 may include an electric conduction assistant, a binder, or the like other than the negative electrode active material 331 and the solid electrolyte 212.

However, the content of the component other than the negative electrode active material 331 and the solid electrolyte 212 in the negative electrode composite material 330 is preferably 10 mass % or less, more preferably 7 mass % or less, and further more preferably 5 mass % or less.

As the electric conduction assistant, any material may be used as long as it is an electric conductor whose electrochemical interaction can be ignored at a negative electrode reaction potential, and more specifically, for example, a carbon material such as acetylene black, Ketjen black, or a carbon nanotube, a noble metal such as palladium or platinum, an electric conductive oxide such as $SnO_2$, $ZnO$, $RuO_2$, $ReO_3$, or $Ir_2O_3$, or the like can be used.

The thickness of the negative electrode composite material 330 is not particularly limited, but is preferably 0.1 μm or more and 500 μm or less, and more preferably 0.3 μm or more and 100 μm or less.

[4-4] Secondary Battery of Fourth Embodiment

Next, a secondary battery according to a fourth embodiment will be described.

Figure 6:
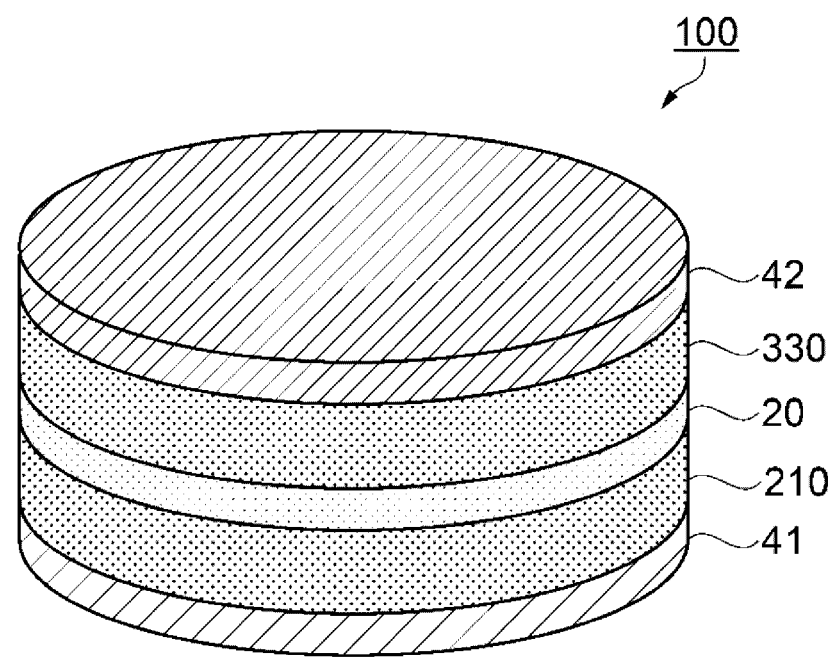
FIG. 6 is a schematic perspective view schematically showing a configuration of a lithium-ion battery as a secondary battery of a fourth embodiment.
Figure 7:
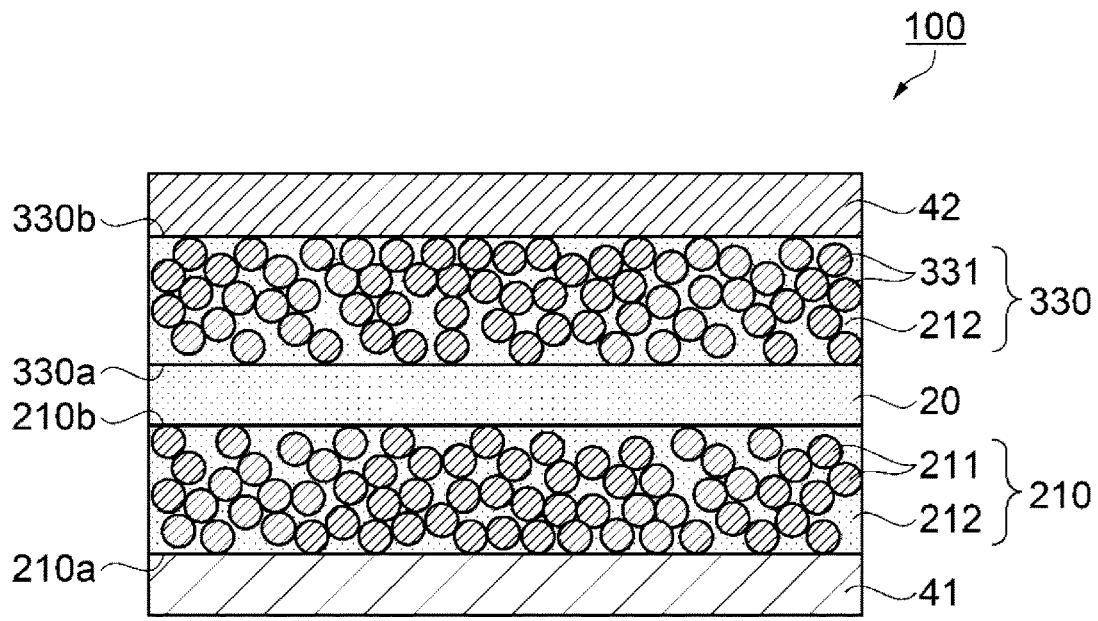
FIG. 7 is a schematic cross-sectional view schematically showing a structure of the lithium-ion battery as the secondary battery of the fourth embodiment.

FIG. 6 is a schematic perspective view schematically showing a configuration of a lithium-ion battery as the secondary battery of the fourth embodiment, and FIG. 7 is a schematic cross-sectional view schematically showing a structure of the lithium-ion battery as the secondary battery of the fourth embodiment.

Hereinafter, the secondary battery according to the fourth embodiment will be described with reference to these drawings, but different points from the above-mentioned embodiments will be mainly described, and the description of the same matter will be omitted.

As shown in FIG. 6, a lithium-ion battery 100 as the secondary battery of this embodiment includes a positive electrode composite material 210, and a solid electrolyte layer 20 and a negative electrode composite material 330, which are sequentially stacked on the positive electrode composite material 210. The lithium-ion battery further includes a current collector 41 in contact with the positive electrode composite material 210 at an opposite face side of the positive electrode composite material 210 from a face thereof facing the solid electrolyte layer 20, and includes a current collector 42 in contact with the negative electrode composite material 330 at an opposite face side of the negative electrode composite material 330 from a face thereof facing the solid electrolyte layer 20.

It is preferred that the respective portions satisfy the same conditions as described for the respective portions corresponding thereto in the above-mentioned embodiments.

In the first to fourth embodiments, another layer may be provided between layers or at a surface of a layer of the respective layers constituting the lithium-ion battery 100. Examples of such a layer include an adhesive layer, an insulating layer, and a protective layer.

[5] Method for Producing Secondary Battery

Next, a method for producing the above-mentioned secondary battery will be described.

[5-1] Method for Producing Secondary Battery of First Embodiment

Hereinafter, a method for producing the secondary battery according to the first embodiment will be described.

Figure 8:
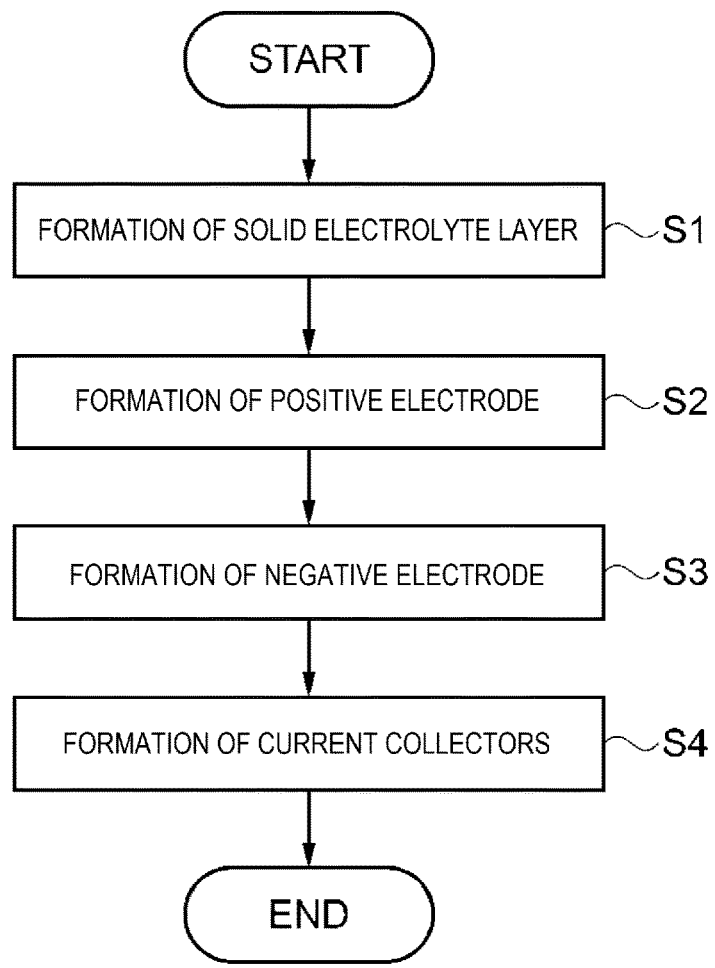
FIG. 8 is a flowchart showing a method for producing the lithium-ion battery as the secondary battery of the first embodiment.
Figure 9:
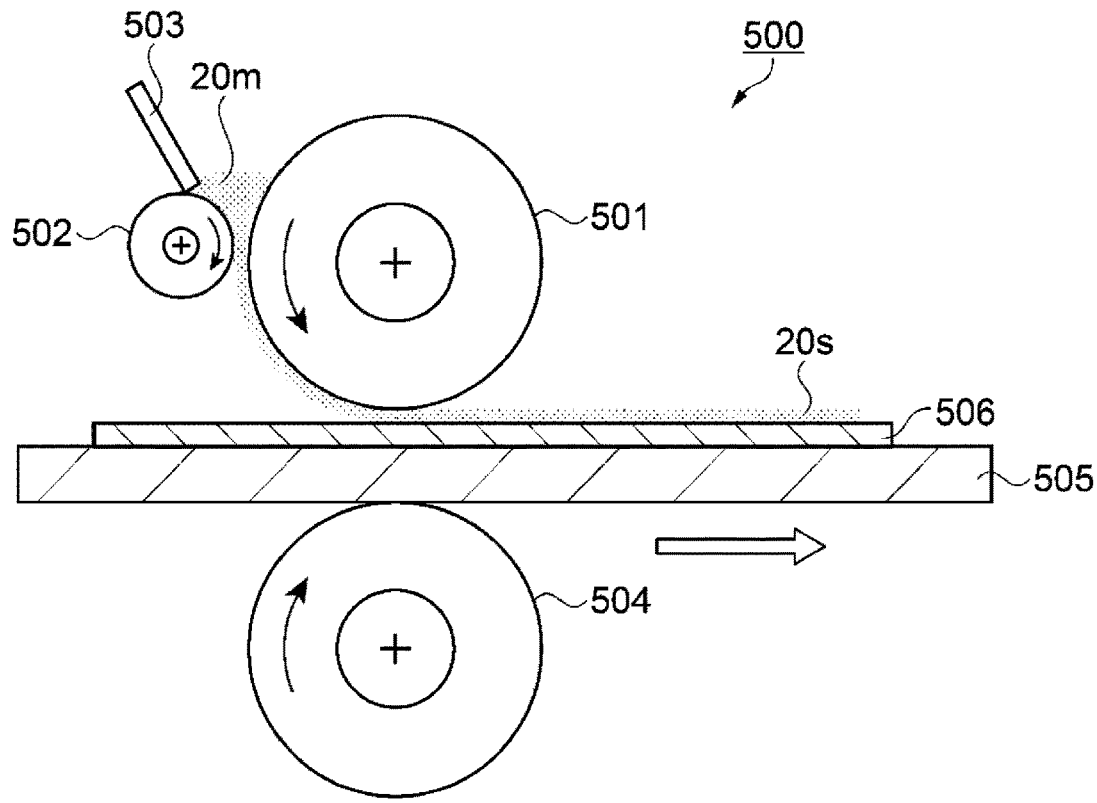
FIG. 9 is a schematic view schematically showing the method for producing the lithium-ion battery as the secondary battery of the first embodiment.
Figure 10:
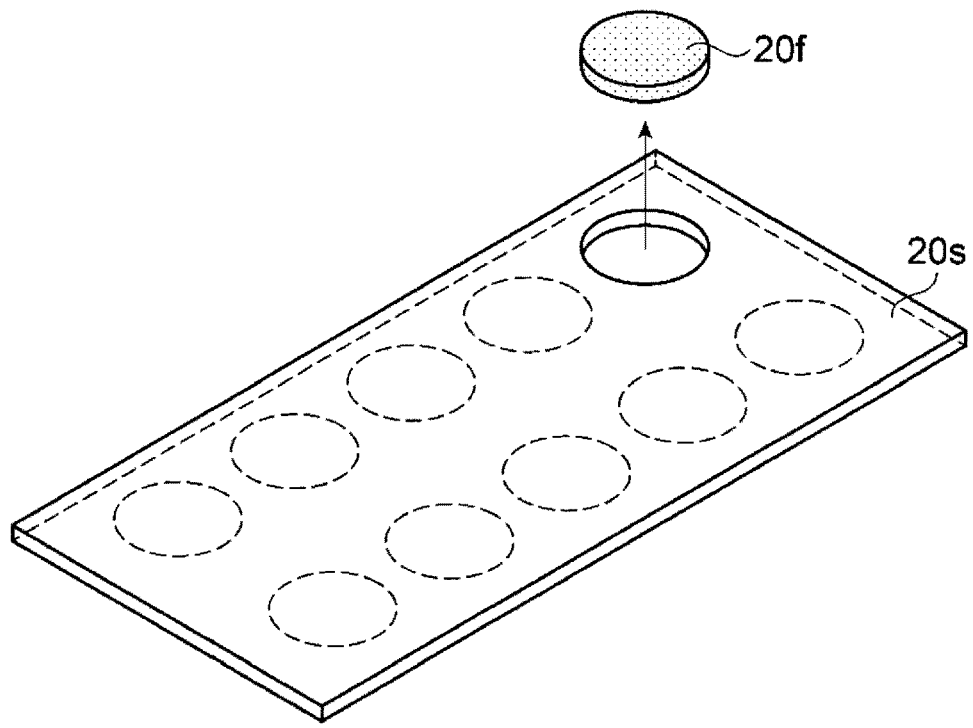
FIG. 10 is a schematic view schematically showing the method for producing the lithium-ion battery as the secondary battery of the first embodiment.
Figure 11:
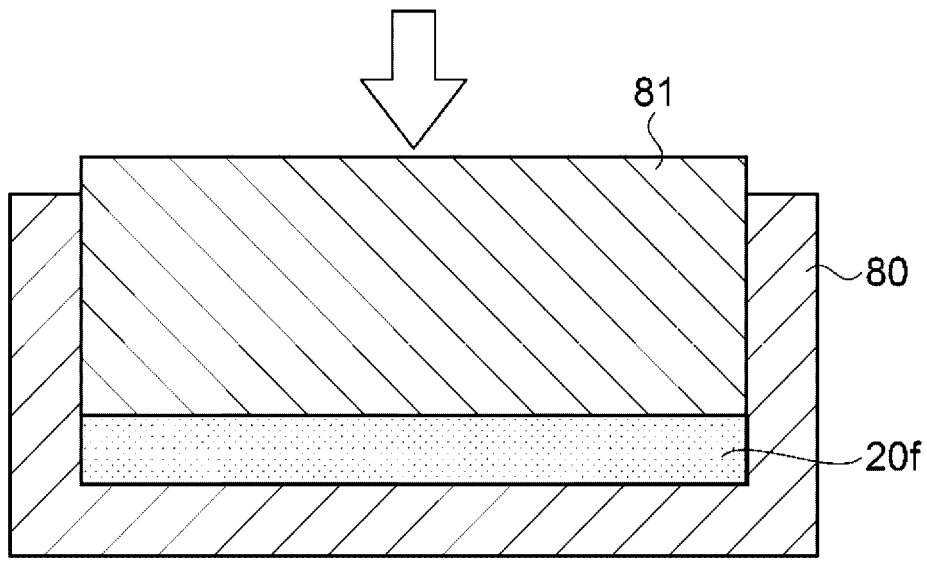
FIG. 11 is a schematic cross-sectional view schematically showing another method for forming a solid electrolyte layer.

FIG. 8 is a flowchart showing the method for producing the lithium-ion battery as the secondary battery of the first embodiment, FIGS. 9 and 10 are schematic views schematically showing the method for producing the lithium-ion battery as the secondary battery of the first embodiment, and FIG. 11 is a schematic cross-sectional view schematically showing another method for forming a solid electrolyte layer.

As shown in FIG. 8, the method for producing the lithium-ion battery 100 of this embodiment includes Step S1, Step S2, Step S3, and Step S4.

Step S1 is a step of forming the solid electrolyte layer 20. Step S2 is a step of forming the positive electrode 10. Step S3 is a step of forming the negative electrode 30. Step S4 is a step of forming the current collectors 41 and 42.

[5-1-1] Step S1

In the step of forming the solid electrolyte layer 20 of Step S1, the solid electrolyte layer 20 is formed by, for example, a green sheet method using the calcined body according to the present disclosure as described above, that is, a calcined body containing a precursor oxide and an oxoacid compound. More specifically, the solid electrolyte layer 20 can be formed as follows.

That is, first, for example, a solution in which a binder such as polypropylene carbonate is dissolved in a solvent such as 1,4-dioxane is prepared, and the solution and the calcined body according to the present disclosure are mixed, whereby a slurry 20m is obtained. In the preparation of the slurry 20m, a dispersant, a diluent, a humectant, or the like may be further used as needed.

Subsequently, by using the slurry 20m, a solid electrolyte forming sheet 20s is formed. More specifically, as shown in FIG. 9, for example, by using a fully automatic film applicator 500, the slurry 20m is applied to a predetermined thickness onto a base material 506 such as a polyethylene terephthalate film, whereby the solid electrolyte forming sheet 20s is formed. The fully automatic film applicator 500 includes an application roller 501 and a doctor roller 502. A squeegee 503 is provided so as to come in contact with the doctor roller 502 from above. A conveyance roller 504 is provided below the application roller 501 at a position opposite thereto, and a stage 505 on which the base material 506 is placed is conveyed in a fixed direction by inserting the stage 505 between the application roller 501 and the conveyance roller 504. The slurry 20m is fed to a side where the squeegee 503 is provided between the application roller 501 and the doctor roller 502 disposed with a gap therebetween in the conveyance direction of the stage 505. The slurry 20m with a predetermined thickness is applied to the surface of the application roller 501 by rotating the application roller 501 and the doctor roller 502 so as to extrude the slurry 20m downward from the gap. Then, along with this, by rotating the conveyance roller 504, the stage 505 is conveyed so that the base material 506 comes in contact with the application roller 501 to which the slurry 20m has been applied. By doing this, the slurry 20m applied to the application roller 501 is transferred in a sheet form to the base material 506, whereby the solid electrolyte forming sheet 20s is formed.

Thereafter, the solvent is removed from the solid electrolyte forming sheet 20s formed on the base material 506, and the solid electrolyte forming sheet 20s is detached from the base material 506 and punched to a predetermined size using a punching die as shown in FIG. 10, whereby a molded material 20f is formed.

Thereafter, the molded material 20f is subjected to a heating step at a temperature of 700° C. or higher and 1000° C. or lower, whereby the solid electrolyte layer 20 as a main fired body is obtained. The heating time and atmosphere in the heating step are as described above.

The solid electrolyte forming sheet 20s with a predetermined thickness may be formed by pressing and extruding the slurry 20m by the application roller 501 and the doctor roller 502 so that the sintered density of the solid electrolyte layer 20 after firing becomes 90% or more.

[5-1-2] Step S2

After Step S1, the process proceeds to Step S2.

In the step of forming the positive electrode 10 of Step S2, the positive electrode 10 is formed at one face of the solid electrolyte layer 20. More specifically, for example, first, by using a sputtering device, sputtering is performed using $LiCoO_2$ as a target in an inert gas such as argon gas, whereby a $LiCoO_2$ layer is formed at a surface of the solid electrolyte layer 20. Thereafter, the $LiCoO_2$ layer formed on the solid electrolyte layer 20 is fired in an oxidizing atmosphere so as to convert the crystal of the $LiCoO_2$ layer into a high-temperature phase crystal, whereby the $LiCoO_2$ layer can be converted into the positive electrode 10. The firing conditions for the $LiCoO_2$ layer are not particularly limited, but the heating temperature can be set to 400° C. or higher and 600° C. or lower, and the heating time can be set to 1 hour or more and 3 hours or less.

[5-1-3] Step S3

After Step S2, the process proceeds to Step S3.

In the step of forming the negative electrode 30 of Step S3, the negative electrode 30 is formed at the other face of the solid electrolyte layer 20, that is, a face at an opposite side from the face at which the positive electrode 10 is formed. More specifically, for example, by using a vacuum deposition device or the like, the negative electrode 30 can be formed by forming a thin film of metal Li at a face of the solid electrolyte layer 20 at an opposite side from the face at which the positive electrode 10 is formed. The thickness of the negative electrode 30 can be set to, for example, 0.1 μm or more and 500 μm or less.

[5-1-4] Step S4

After Step S3, the process proceeds to Step S4.

In the step of forming the current collectors 41 and 42 of Step S4, the current collector 41 is formed so as to come in contact with the positive electrode 10, and the current collector 42 is formed so as to come in contact with the negative electrode 30. More specifically, for example, an aluminum foil formed into a circular shape by punching or the like is joined to the positive electrode 10 by pressing, whereby the current collector 41 can be formed. Further, for example, a copper foil formed into a circular shape by punching or the like is joined to the negative electrode 30 by pressing, whereby the current collector 42 can be formed. The thickness of each of the current collectors 41 and 42 is not particularly limited, but can be set to, for example, 10 μm or more and 60 μm or less. In this step, only one of the current collectors 41 and 42 may be formed.

The method for forming the solid electrolyte layer 20 is not limited to the green sheet method shown in Step S1. As another method for forming the solid electrolyte layer 20, for example, a method as described below can be adopted. That is, as shown in FIG. 11, the molded material 20f may be obtained by filling the calcined body according to the present disclosure in a powder form, that is, a calcined body containing a precursor oxide and an oxoacid compound in a pellet die 80, closing the pellet die using a lid 81, and pressing the lid 81 to perform uniaxial press molding. A treatment for the molded material 20f thereafter can be performed in the same manner as described above. As the pellet die 80, a die including an exhaust port (not shown) can be favorably used.

[5-2] Method for Producing Secondary Battery of Second Embodiment

Next, a method for producing the secondary battery according to the second embodiment will be described.

Figure 12:
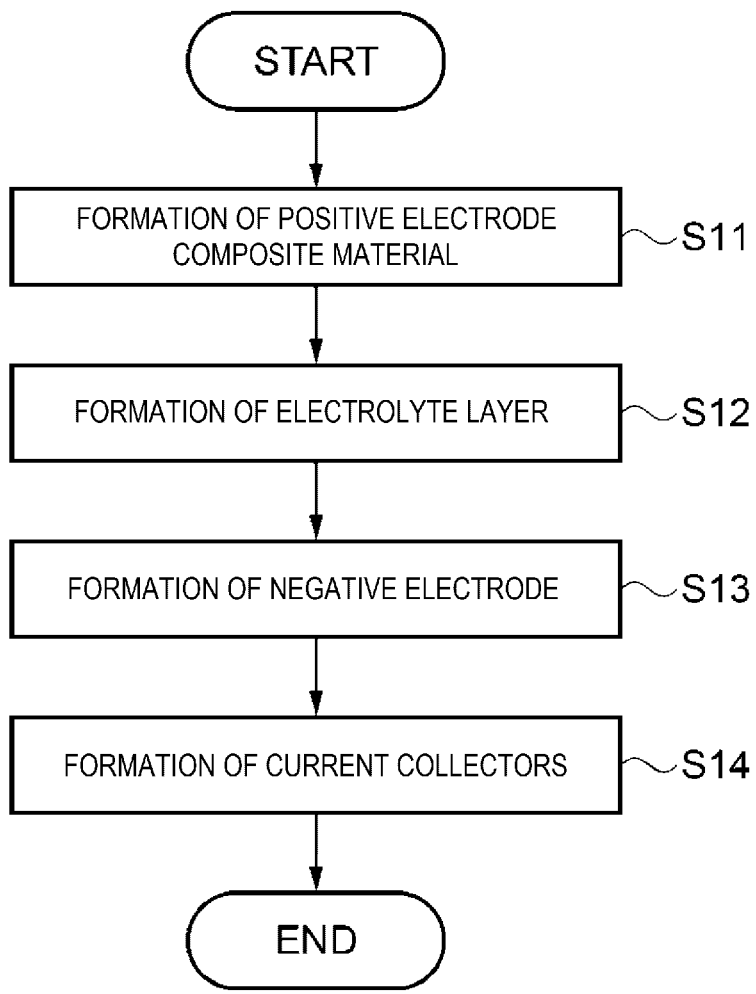
FIG. 12 is a flowchart showing a method for producing the lithium-ion battery as the secondary battery of the second embodiment.
Figure 13:
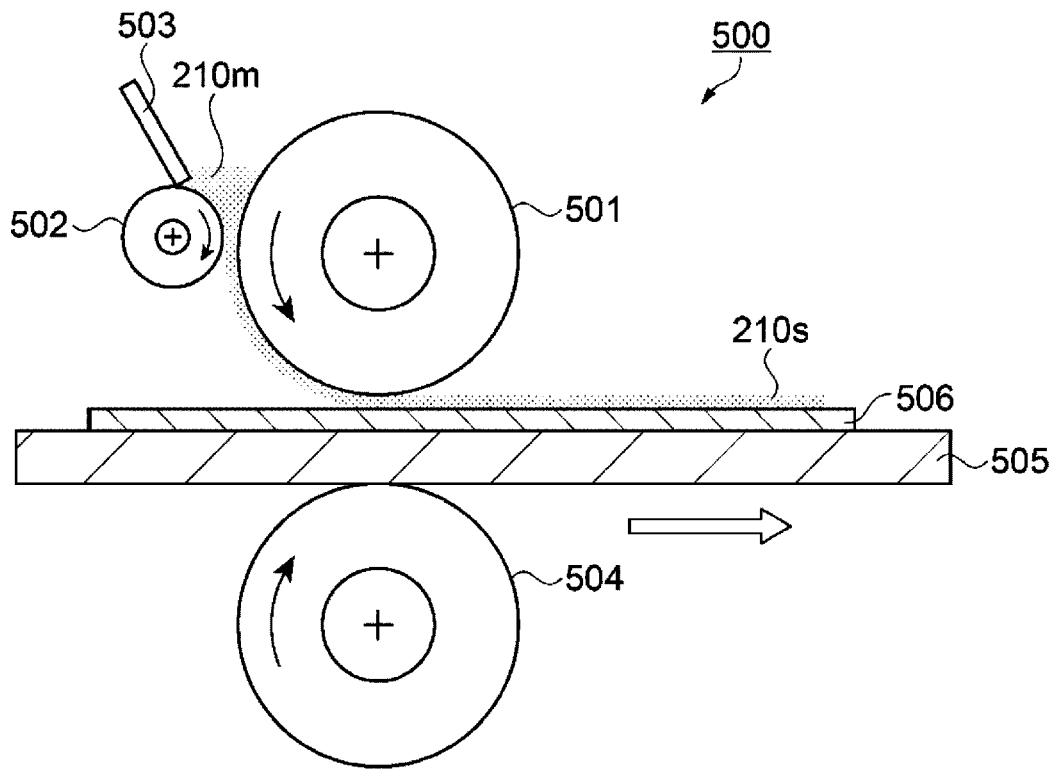
FIG. 13 is a schematic view schematically showing the method for producing the lithium-ion battery as the secondary battery of the second embodiment.
Figure 14:
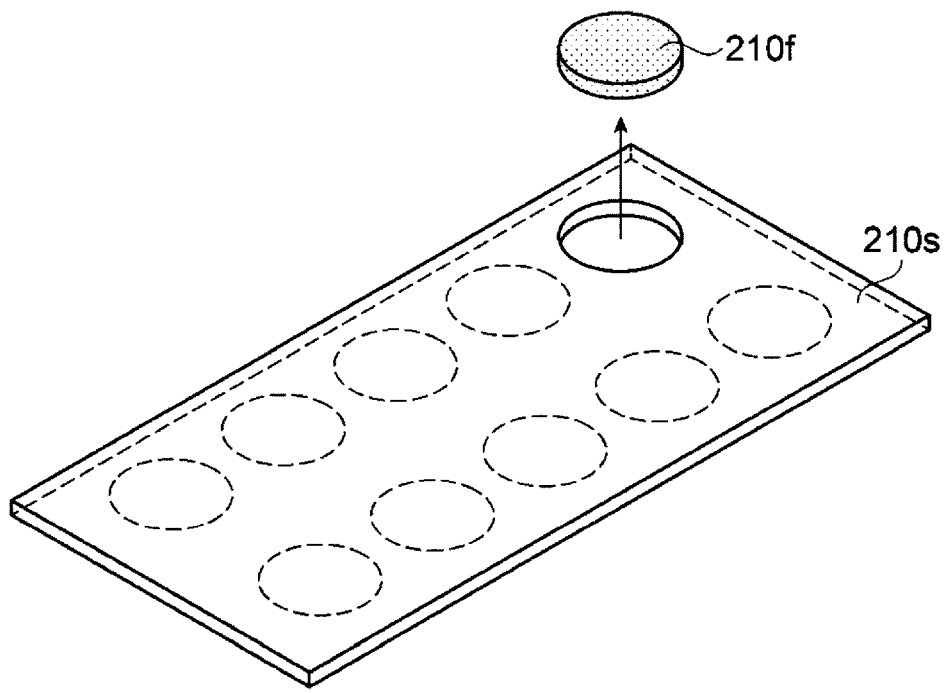
FIG. 14 is a schematic view schematically showing the method for producing the lithium-ion battery as the secondary battery of the second embodiment.

FIG. 12 is a flowchart showing the method for producing the lithium-ion battery as the secondary battery of the second embodiment, and FIGS. 13 and 14 are schematic views schematically showing the method for producing the lithium-ion battery as the secondary battery of the second embodiment.

Hereinafter, the method for producing the secondary battery according to the second embodiment will be described with reference to these drawings, but different points from the above-mentioned embodiment will be mainly described, and the description of the same matter will be omitted.

As shown in FIG. 12, the method for producing the lithium-ion battery 100 of this embodiment includes Step S11, Step S12, Step S13, and Step S14.

Step S11 is a step of forming the positive electrode composite material 210. Step S12 is a step of forming the electrolyte layer 220. Step S13 is a step of forming the negative electrode 30. Step S14 is a step of forming the current collectors 41 and 42.

[5-2-1] Step S11

In the step of forming the positive electrode composite material 210 of Step S11, the positive electrode composite material 210 is formed.

The positive electrode composite material 210 can be formed, for example, as follows.

That is, first, for example, a slurry 210m as a mixture of the positive electrode active material 211 such as $LiCoO_2$, the calcined body according to the present disclosure as described above, that is, a calcined body containing a precursor oxide and an oxoacid compound, a binder such as polypropylene carbonate, and a solvent such as 1,4-dioxane is obtained. In the preparation of the slurry 210m, a dispersant, a diluent, a humectant, or the like may be further used as needed.

Subsequently, by using the slurry 210m, a positive electrode composite material forming sheet 210s is formed. More specifically, as shown in FIG. 13, for example, by using a fully automatic film applicator 500, the slurry 210m is applied to a predetermined thickness onto a base material 506 such as a polyethylene terephthalate film, whereby the positive electrode composite material forming sheet 210s is formed.

Thereafter, the solvent is removed from the positive electrode composite material forming sheet 210s formed on the base material 506, and the positive electrode composite material forming sheet 210s is detached from the base material 506 and punched to a predetermined size using a punching die as shown in FIG. 14, whereby a molded material 210f is formed.

Thereafter, the molded material 210f is subjected to a heating step at a temperature of 700° C. or higher and 1000° C. or lower, whereby the positive electrode composite material 210 including a solid electrolyte is obtained. The heating time and atmosphere in the heating step are as described above.

[5-2-2] Step S12

After Step S11, the process proceeds to Step S12.

In the step of forming the electrolyte layer 220 of Step S12, the electrolyte layer 220 is formed at one face 210b of the positive electrode composite material 210. More specifically, for example, by using a sputtering device, sputtering is performed using $LiCoO_2$ as a target in an inert gas such as argon gas, whereby a $LiCoO_2$ layer is formed at a surface of the positive electrode composite material 210. Thereafter, the $LiCoO_2$ layer formed on the positive electrode composite material 210 is fired in an oxidizing atmosphere so as to convert the crystal of the $LiCoO_2$ layer into a high-temperature phase crystal, whereby the $LiCoO_2$ layer can be converted into the electrolyte layer 220. The firing conditions for the $LiCoO_2$ layer are not particularly limited, but the heating temperature can be set to 400° C. or higher and 600° C. or lower, and the heating time can be set to 1 hour or more and 3 hours or less.

[5-2-3] Step S13

After Step S12, the process proceeds to Step S13.

In the step of forming the negative electrode 30 of Step S13, the negative electrode 30 is formed at an opposite face side of the electrolyte layer 220 from a face thereof facing the positive electrode composite material 210. More specifically, for example, by using a vacuum deposition device or the like, the negative electrode 30 can be formed by forming a thin film of metal Li at an opposite face side of the electrolyte layer 220 from a face thereof facing the positive electrode composite material 210.

[5-2-4] Step S14

After Step S13, the process proceeds to Step S14.

In the step of forming the current collectors 41 and 42 of Step S14, the current collector 41 is formed so as to come in contact with the other face of the positive electrode composite material 210, that is, a face 210a at an opposite side from the face 210b at which the electrolyte layer 220 is formed, and the current collector 42 is formed so as to come in contact with the negative electrode 30.

The methods for forming the positive electrode composite material 210 and the electrolyte layer 220 are not limited to the above-mentioned methods. For example, the positive electrode composite material 210 and the electrolyte layer 220 may be formed as follows. That is, first, a slurry as a mixture of the calcined body according to the present disclosure, that is, a calcined body containing a precursor oxide and an oxoacid compound, a binder, and a solvent is obtained. Then, the obtained slurry is fed to a fully automatic film applicator 500 and applied onto the base material 506, whereby an electrolyte forming sheet is formed. Thereafter, the electrolyte forming sheet and the positive electrode composite material forming sheet 210s formed in the same manner as described above are pressed in a stacked state and bonded to each other. Thereafter, a stacked sheet obtained by bonding the sheets to each other is punched to form a molded material, and the molded material is fired in an oxidizing atmosphere, whereby a stacked body of the positive electrode composite material 210 and the electrolyte layer 220 may be obtained.

[5-3] Method for Producing Secondary Battery of Third Embodiment

Next, a method for producing the secondary battery according to the third embodiment will be described.

Figure 15:
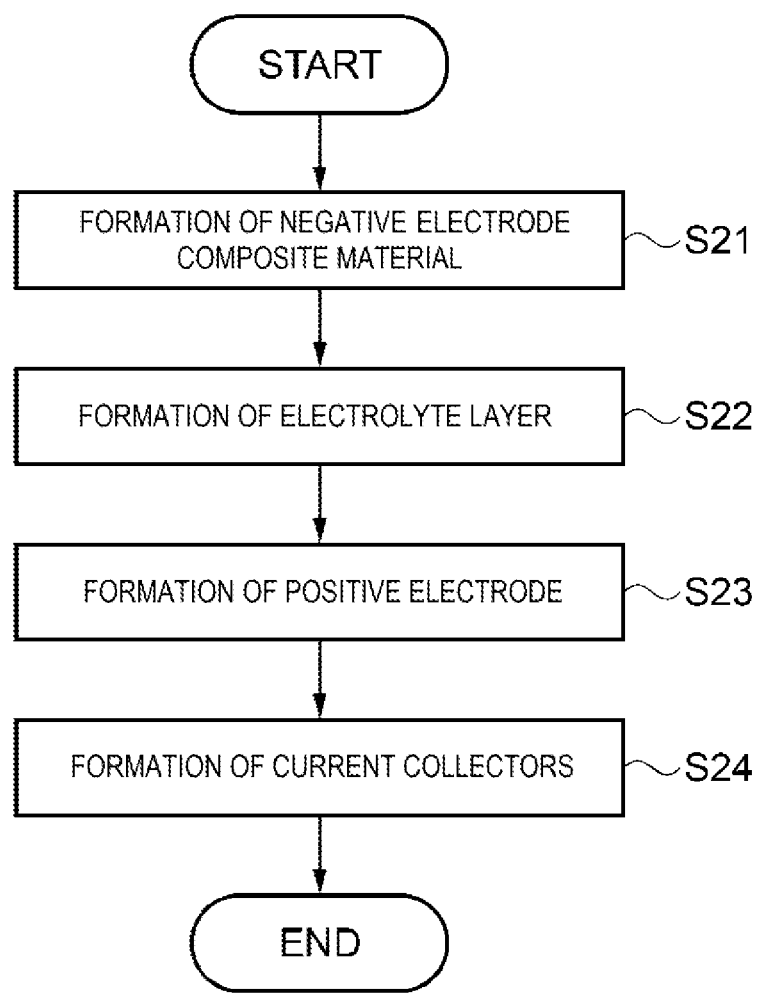
FIG. 15 is a flowchart showing a method for producing the lithium-ion battery as the secondary battery of the third embodiment.
Figure 16:
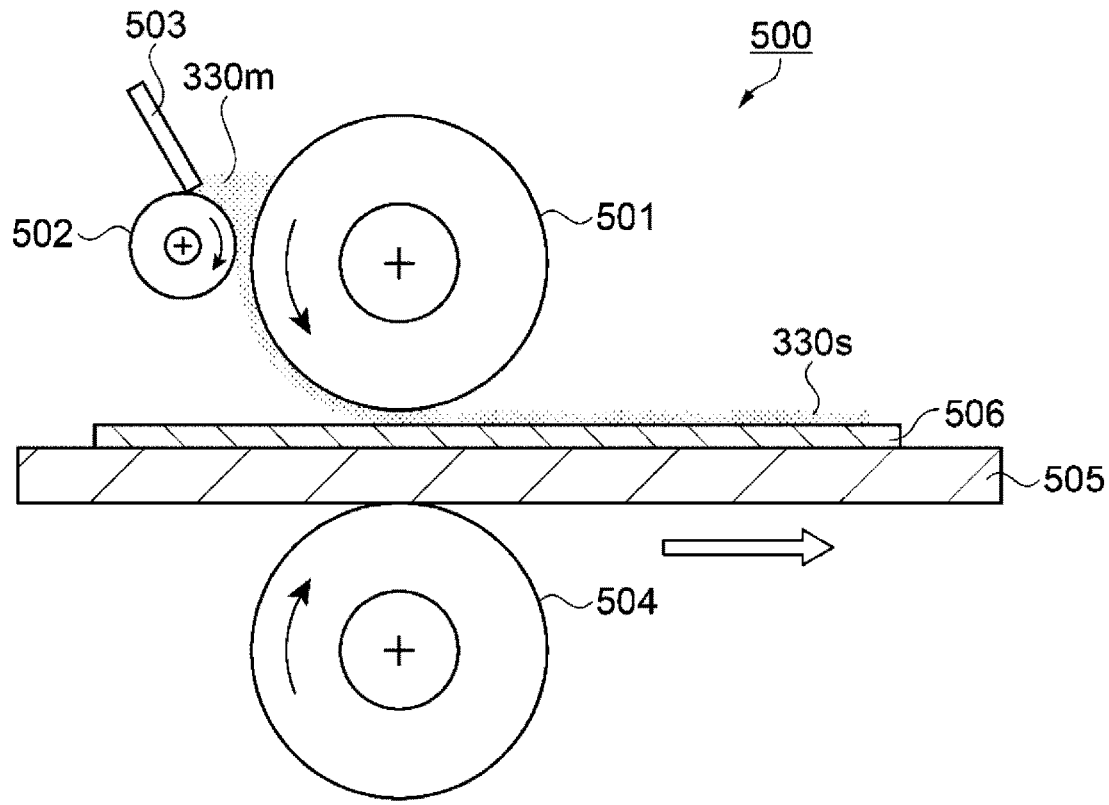
FIG. 16 is a schematic view schematically showing the method for producing the lithium-ion battery as the secondary battery of the third embodiment.
Figure 17:
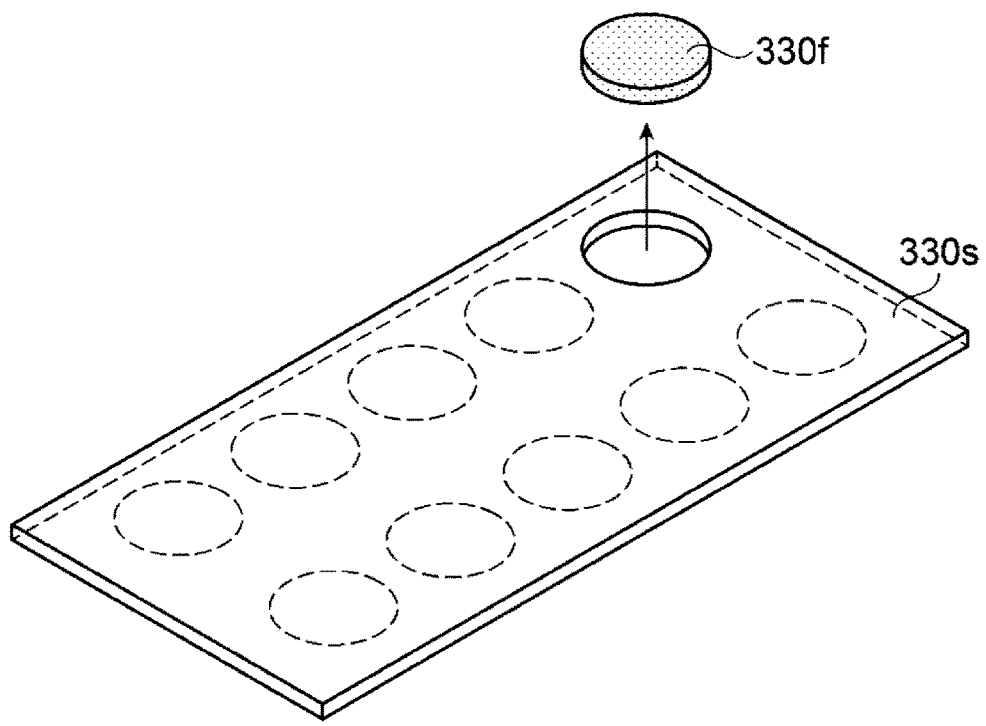
FIG. 17 is a schematic view schematically showing the method for producing the lithium-ion battery as the secondary battery of the third embodiment.

FIG. 15 is a flowchart showing the method for producing the lithium-ion battery as the secondary battery of the third embodiment, and FIGS. 16 and 17 are schematic views schematically showing the method for producing the lithium-ion battery as the secondary battery of the third embodiment.

Hereinafter, the method for producing the secondary battery according to the third embodiment will be described with reference to these drawings, but different points from the above-mentioned embodiments will be mainly described, and the description of the same matter will be omitted.

As shown in FIG. 15, the method for producing the lithium-ion battery 100 of this embodiment includes Step S21, Step S22, Step S23, and Step S24.

Step S21 is a step of forming the negative electrode composite material 330. Step S22 is a step of forming the electrolyte layer 220. Step S23 is a step of forming the positive electrode 10. Step S24 is a step of forming the current collectors 41 and 42.

[5-3-1] Step S21

In the step of forming the negative electrode composite material 330 of Step S21, the negative electrode composite material 330 is formed.

The negative electrode composite material 330 can be formed, for example, as follows.

That is, first, for example, a slurry 330m as a mixture of the negative electrode active material 331 such as $Li_4Ti_5O_{12}$, the calcined body according to the present disclosure, that is, a calcined body containing a precursor oxide and an oxoacid compound, a binder such as polypropylene carbonate, and a solvent such as 1,4-dioxane is obtained. In the preparation of the slurry 330m, a dispersant, a diluent, a humectant, or the like may be further used as needed.

Subsequently, by using the slurry 330m, a negative electrode composite material forming sheet 330s is formed. More specifically, as shown in FIG. 16, for example, by using a fully automatic film applicator 500, the slurry 330m is applied to a predetermined thickness onto a base material 506 such as a polyethylene terephthalate film, whereby the negative electrode composite material forming sheet 330s is formed.

Thereafter, the solvent is removed from the negative electrode composite material forming sheet 330s formed on the base material 506, and the negative electrode composite material forming sheet 330s is detached from the base material 506 and punched to a predetermined size using a punching die as shown in FIG. 17, whereby a molded material 330f is formed.

Thereafter, the molded material 330f is subjected to a heating step at a temperature of 700° C. or higher and 1000° C. or lower, whereby the negative electrode composite material 330 including a solid electrolyte is obtained. The heating time and atmosphere in the heating step are as described above.

[5-3-2] Step S22

After Step S21, the process proceeds to Step S22.

In the step of forming the electrolyte layer 220 of Step S22, the electrolyte layer 220 is formed at one face 330a of the negative electrode composite material 330. More specifically, for example, by using a sputtering device, sputtering is performed using $Li_{2.2}C_{0.8}B_{0.2}O_3$ which is a solid solution of $Li_2CO_3$ and $Li_3BO_3$ as a target in an inert gas such as argon gas, whereby a $Li_{2.2}C_{0.8}B_{0.2}O_3$ layer is formed at a surface of the negative electrode composite material 330. Thereafter, the $Li_{2.2}C_{0.8}B_{0.2}O_3$ layer formed on the negative electrode composite material 330 is fired in an oxidizing atmosphere so as to convert the crystal of the $Li_{2.2}C_{0.8}B_{0.2}O_3$ layer into a high-temperature phase crystal, whereby the $Li_{2.2}C_{0.8}B_{0.2}O_3$ layer can be converted into the electrolyte layer 220. The firing conditions for the $Li_{2.2}C_{0.8}B_{0.2}O_3$ layer are not particularly limited, but the heating temperature can be set to 400° C. or higher and 600° C. or lower, and the heating time can be set to 1 hour or more and 3 hours or less.

[5-3-3] Step S23

After Step S22, the process proceeds to Step S23.

In the step of forming the positive electrode 10 of Step S23, the positive electrode 10 is formed at one face 220a side of the electrolyte layer 220, that is, an opposite face side of the electrolyte layer 220 from a face thereof facing the negative electrode composite material 330. More specifically, for example, first, by using a vacuum deposition device or the like, a $LiCoO_2$ layer is formed at one face 220a of the electrolyte layer 220. Thereafter, a stacked body of the electrolyte layer 220 at which the $LiCoO_2$ layer is formed, and the negative electrode composite material 330 is fired so as to convert the crystal of the $LiCoO_2$ layer into a high-temperature phase crystal, whereby the $LiCoO_2$ layer can be converted into the positive electrode 10. The firing conditions for the $LiCoO_2$ layer are not particularly limited, but the heating temperature can be set to 400° C. or higher and 600° C. or lower, and the heating time can be set to 1 hour or more and 3 hours or less.

[5-3-4] Step S24

After Step S23, the process proceeds to Step S24.

In the step of forming the current collectors 41 and 42 of Step S24, the current collector 41 is formed so as to come in contact with one face 10a of the positive electrode 10, that is, the face 10a of the positive electrode 10 at an opposite side from the face at which the electrolyte layer 220 is formed, and the current collector 42 is formed so as to come in contact with the other face of the negative electrode composite material 330, that is, a face 330b of the negative electrode composite material 330 at an opposite side from the face 330a at which the electrolyte layer 220 is formed.

The methods for forming the negative electrode composite material 330 and the electrolyte layer 220 are not limited to the above-mentioned methods. For example, the negative electrode composite material 330 and the electrolyte layer 220 may be formed as follows. That is, first, a slurry as a mixture of the calcined body according to the present disclosure, that is, a calcined body containing a precursor oxide and an oxoacid compound, a binder, and a solvent is obtained. Then, the obtained slurry is fed to a fully automatic film applicator 500 and applied onto the base material 506, whereby an electrolyte forming sheet is formed. Thereafter, the electrolyte forming sheet and the negative electrode composite material forming sheet 330s formed in the same manner as described above are pressed in a stacked state and bonded to each other. Thereafter, a stacked sheet obtained by bonding the sheets to each other is punched to form a molded material, and the molded material is fired in an oxidizing atmosphere, whereby a stacked body of the negative electrode composite material 330 and the electrolyte layer 220 may be obtained.

[5-4] Method for Producing Secondary Battery of Fourth Embodiment

Next, a method for producing the secondary battery according to the fourth embodiment will be described.

Figure 18:
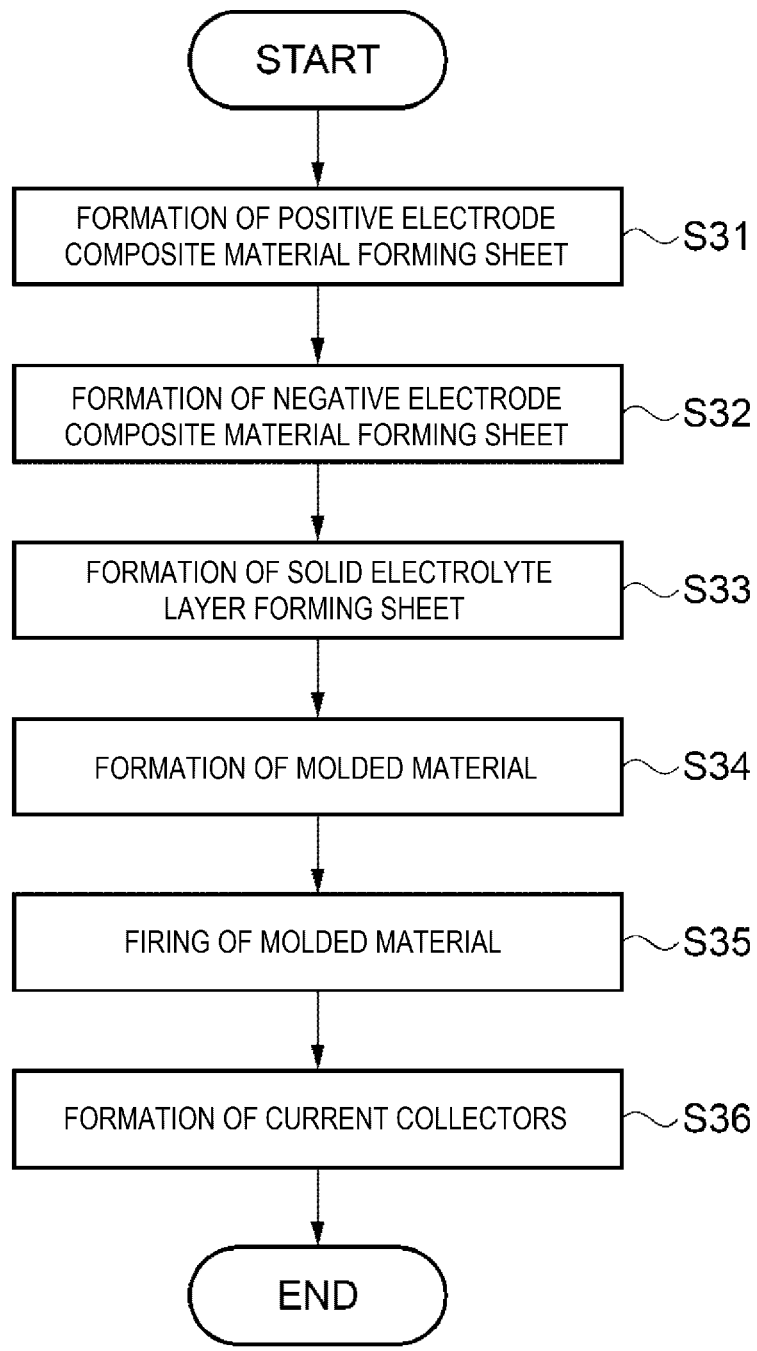
FIG. 18 is a flowchart showing a method for producing the lithium-ion battery as the secondary battery of the fourth embodiment.
Figure 19:
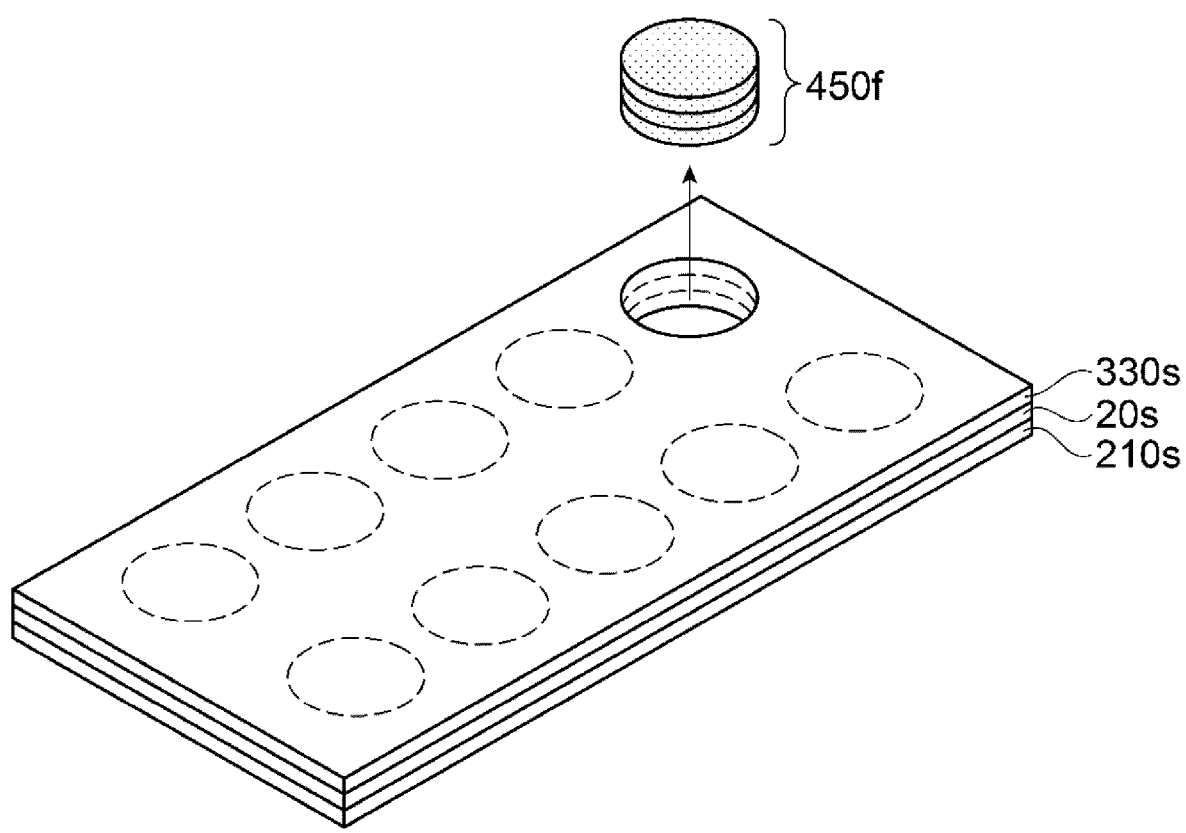
FIG. 19 is a schematic view schematically showing the method for producing the lithium-ion battery as the secondary battery of the fourth embodiment.

FIG. 18 is a flowchart showing the method for producing the lithium-ion battery as the secondary battery of the fourth embodiment, and FIG. 19 is a schematic view schematically showing the method for producing the lithium-ion battery as the secondary battery of the fourth embodiment.

Hereinafter, the method for producing the secondary battery according to the fourth embodiment will be described with reference to these drawings, but different points from the above-mentioned embodiments will be mainly described, and the description of the same matter will be omitted.

As shown in FIG. 18, the method for producing the lithium-ion battery 100 of this embodiment includes Step S31, Step S32, Step S33, Step S34, Step S35, and Step S36.

Step S31 is a step of forming a sheet for forming the positive electrode composite material 210. Step S32 is a step of forming a sheet for forming the negative electrode composite material 330. Step S33 is a step of forming a sheet for forming the solid electrolyte layer 20. Step S34 is a step of forming a molded material 450f of molding a stacked body of the sheet for forming the positive electrode composite material 210, the sheet for forming the negative electrode composite material 330, and the sheet for forming the solid electrolyte layer 20 into a predetermined shape. Step S35 is a step of firing the molded material 450f. Step S36 is a step of forming the current collectors 41 and 42.

In the following description, a description will be made by assuming that Step S32 is performed after Step S31, and Step S33 is performed after Step S32, however, the order of Step S31, Step S32, and Step S33 is not limited thereto, and the order of the steps may be changed, or the steps may be concurrently performed.

[5-4-1] Step S31

In the step of forming a sheet for forming the positive electrode composite material 210 of Step S31, a positive electrode composite material forming sheet 210s that is the sheet for forming the positive electrode composite material 210 is formed.

The positive electrode composite material forming sheet 210s can be formed, for example, in the same manner as described in the above second embodiment.

The positive electrode composite material forming sheet 210s obtained in this step is preferably one obtained by removing the solvent from the slurry 210m used for forming the positive electrode composite material forming sheet 210s.

[5-4-2] Step S32

After Step S31, the process proceeds to Step S32.

In the step of forming a sheet for forming the negative electrode composite material 330 of Step S32, a negative electrode composite material forming sheet 330s that is the sheet for forming the negative electrode composite material 330 is formed.

The negative electrode composite material forming sheet 330s can be formed, for example, in the same manner as described in the above third embodiment.

The negative electrode composite material forming sheet 330s obtained in this step is preferably one obtained by removing the solvent from the slurry 330m used for forming the negative electrode composite material forming sheet 330s.

[5-4-3] Step S33

After Step S32, the process proceeds to Step S33.

In the step of forming a sheet for forming the solid electrolyte layer 20 of Step S33, a solid electrolyte forming sheet 20s that is the sheet for forming the solid electrolyte layer 20 is formed.

The solid electrolyte forming sheet 20s can be formed, for example, in the same manner as described in the above first embodiment.

The solid electrolyte forming sheet 20s obtained in this step is preferably one obtained by removing the solvent from the slurry 20m used for forming the solid electrolyte forming sheet 20s.

[5-4-4] Step S34

After Step S33, the process proceeds to Step S34.

In the step of forming the molded material 450f of Step S34, the positive electrode composite material forming sheet 210s, the solid electrolyte forming sheet 20s, and the negative electrode composite material forming sheet 330s are pressed in a state of being stacked in this order and bonded to one another. Thereafter, as shown in FIG. 19, a stacked sheet obtained by bonding the sheets to one another is punched, whereby the molded material 450f is obtained.

[5-4-5] Step S35

After Step S34, the process proceeds to Step S35.

In the step of firing the molded material 450f of Step S35, the molded material 450f is subjected to a heating step at a temperature of 700° C. or higher and 1000° C. or lower. By doing this, a portion constituted by the positive electrode composite material forming sheet 210s is converted into the positive electrode composite material 210, a portion constituted by the solid electrolyte forming sheet 20s is converted into the solid electrolyte layer 20, and a portion constituted by the negative electrode composite material forming sheet 330s is converted into the negative electrode composite material 330. That is, a fired body of the molded material 450f is a stacked body of the positive electrode composite material 210, the solid electrolyte layer 20, and the negative electrode composite material 330. The heating time and atmosphere in the heating step are as described above.

[5-4-6] Step S36

After Step S35, the process proceeds to Step S36.

In the step of forming the current collectors 41 and 42 of Step S36, the current collector 41 is formed so as to come in contact with the face 210a of the positive electrode composite material 210, and the current collector 42 is formed so as to come in contact with the face 330b of the negative electrode composite material 330.

Hereinabove, preferred embodiments of the present disclosure have been described, however, the present disclosure is not limited thereto.

For example, the method for producing a solid electrolyte may further include another step in addition to the steps as described above.

Further, when the present disclosure is applied to a secondary battery, the configuration of the secondary battery is not limited to those of the above-mentioned embodiments.

For example, when the present disclosure is applied to a secondary battery, the secondary battery is not limited to a lithium-ion battery, and may be, for example, a secondary battery in which a porous separator is provided between a positive electrode composite material and a negative electrode, and the separator is impregnated with an electrolyte solution.

Further, when the present disclosure is applied to a secondary battery, the production method therefor is not limited to those of the above-mentioned embodiments. For example, the order of the steps in the production of the secondary battery may be made different from that in the above-mentioned embodiments.

Further, in the above-mentioned embodiments, a description has been made by assuming that the solid electrolyte according to the present disclosure constitutes a part of a secondary battery, particularly a part of an all-solid-state lithium secondary battery that is an all-solid-state secondary battery, however, the solid electrolyte according to the present disclosure may constitute, for example, a part other than an all-solid-state secondary battery or may constitute apart other than a secondary battery.

EXAMPLES

Next, specific Examples of the present disclosure will be described. Note that in the following description, room temperature refers to 25° C. at 1 atm. Further, a treatment or measurement for which the temperature condition is not particularly specified was performed at 25° C., and a treatment or measurement for which the pressure condition is not particularly specified was performed in a 1 atm environment.

[6] Production of Calcined Body

First, calcined bodies to be used in the production of solid electrolytes of the below-mentioned respective Examples and respective Comparative Examples were produced.

In the preparation of the respective calcined bodies, metal compound solutions described below were used.

[6-1] Preparation of Metal Compound Solutions Used in Production of Calcined Bodies

[6-1-1] Preparation of 2-n-Butoxyethanol Solution of Lithium Nitrate

In a 30-g reagent bottle made of Pyrex (Pyrex: trademark of Corning Incorporated, Pyrex is a registered trademark) equipped with a magnetic stirring bar, 1.3789 g of lithium nitrate with a purity of 99.95% (3N5, manufactured by Kanto Chemical Co., Inc.) and 18.6211 g of 2-n-butoxyethanol (ethylene glycol monobutyl ether) (Cica Special Grade, manufactured by Kanto Chemical Co., Inc.) were weighed. Then, the reagent bottle was placed on a hot plate with a magnetic stirrer function, and lithium nitrate was completely dissolved in 2-n-butoxyethanol while stirring at 170° C. for 1 hour. The resulting solution was gradually cooled to room temperature, whereby a 2-n-butoxyethanol solution of 1 mol/kg lithium nitrate was obtained.

[6-1-2] Preparation of 2-n-Butoxyethanol Solution of Lanthanum Nitrate

In a 30-g reagent bottle made of Pyrex equipped with a magnetic stirring bar, 8.6608 g of lanthanum nitrate hexahydrate (4N, manufactured by Kanto Chemical Co., Inc.) and 11.3392 g of 2-n-butoxyethanol (Cica Special Grade, manufactured by Kanto Chemical Co., Inc.) were weighed. Then, the reagent bottle was placed on a hot plate with a magnetic stirrer function, and lanthanum nitrate hexahydrate was completely dissolved in 2-n-butoxyethanol while stirring at 140° C. for 30 minutes. The resulting solution was gradually cooled to room temperature, whereby a 2-n-butoxyethanol solution of 1 mol/kg lanthanum nitrate hexahydrate was obtained.

[6-1-3] Preparation of 2-n-Butoxyethanol Solution of Zirconium Tetra-n-Butoxide

In a 20-g reagent bottle made of Pyrex equipped with a magnetic stirring bar, 3.8368 g of zirconium tetra-n-butoxide (manufactured by Kojundo Chemical Lab. Co., Ltd.) and 6.1632 g of 2-n-butoxyethanol (Cica Special Grade, manufactured by Kanto Chemical Co., Inc.) were weighed. Then, the reagent bottle was placed on a hot plate with a magnetic stirrer function, and zirconium tetra-n-butoxide was completely dissolved in 2-n-butoxyethanol while stirring at room temperature for 30 minutes, whereby a 2-n-butoxyethanol solution of 1 mol/kg zirconium tetra-n-butoxide was obtained.

[6-1-4] Preparation of Ethyl Alcohol Solution of Yttrium Nitrate

In a 30-g reagent bottle made of Pyrex equipped with a magnetic stirring bar, 3.8301 g of yttrium nitrate hexahydrate (3N, manufactured by Kojundo Chemical Lab. Co., Ltd.) and 6.1699 g of ethyl alcohol (EL Grade, manufactured by Kanto Chemical Co., Inc.) were weighed. Then, the reagent bottle was placed on a hot plate with a magnetic stirrer function, and yttrium nitrate hexahydrate was completely dissolved in ethyl alcohol while stirring at 75° C. for 30 minutes. The resulting solution was gradually cooled to room temperature, whereby an ethyl alcohol solution of 1 mol/kg yttrium nitrate hexahydrate was obtained.

[6-1-5] Preparation of 2-n-Butoxyethanol Solution of Niobium Pentaethoxide

In a 20-g reagent bottle made of Pyrex equipped with a magnetic stirring bar, 3.1821 g of niobium pentaethoxide (4N, manufactured by Kojundo Chemical Lab. Co., Ltd.) and 6.8179 g of 2-n-butoxyethanol (Cica Special Grade, manufactured by Kanto Chemical Co., Inc.) were weighed. Then, the reagent bottle was placed on a hot plate with a magnetic stirrer function, and niobium pentaethoxide was completely dissolved in 2-n-butoxyethanol while stirring at room temperature for 30 minutes, whereby a 2-n-butoxyethanol solution of 1 mol/kg niobium pentaethoxide was obtained.

[6-1-6] Preparation of 2-n-Butoxyethanol Solution of Tantalum Pentaethoxide

In a 20-g reagent bottle made of Pyrex equipped with a magnetic stirring bar, 4.0626 g of tantalum pentaethoxide (5N, manufactured by Kojundo Chemical Lab. Co., Ltd.) and 5.9374 g of 2-n-butoxyethanol (Cica Special Grade, manufactured by Kanto Chemical Co., Inc.) were weighed. Then, the reagent bottle was placed on a hot plate with a magnetic stirrer function, and tantalum pentaethoxide was completely dissolved in 2-n-butoxyethanol while stirring at room temperature for 30 minutes, whereby a 2-n-butoxyethanol solution of 1 mol/kg tantalum pentaethoxide was obtained.

[6-1-7] Preparation of 2-n-Butoxyethanol Solution of Antimony tri-n-Butoxide

In a 20-g reagent bottle made of Pyrex equipped with a magnetic stirring bar, 3.4110 g of antimony tri-n-butoxide (manufactured by Wako Pure Chemical Industries, Ltd.) and 6.5890 g of 2-n-butoxyethanol (Cica Special Grade, manufactured by Kanto Chemical Co., Inc.) were weighed. Then, the reagent bottle was placed on a hot plate with a magnetic stirrer function, and antimony tri-n-butoxide was completely dissolved in 2-n-butoxyethanol while stirring at room temperature for 30 minutes, whereby a 2-n-butoxyethanol solution of 1 mol/kg antimony tri-n-butoxide was obtained.

[6-2] Production of Calcined Bodies According to Respective Examples and Comparative Examples By using the respective metal compound solutions obtained as described above, calcined bodies according to the respective Examples and the respective Comparative Examples were produced as follows.

Example 1

In this Example, a calcined body to be used in the production of a solid electrolyte represented by the formulation: $Li_{6.7}(La_{2.95}Y_{0.05})(Zr_{1.7}Nb_{0.25}Ta_{0.05})O_{12}$ was produced as follows.

First, in a reagent bottle made of Pyrex, 8.040 g of a 2-n-butoxyethanol solution of lithium nitrate, 2.950 g of a 2-n-butoxyethanol solution of lanthanum nitrate hexahydrate, and 0.050 g of an ethyl alcohol solution of yttrium nitrate hexahydrate, each of which was prepared as described above, and 2 mL of 2-n-butoxyethanol and 2 mL of ethyl alcohol as organic solvents were weighed. A magnetic stirring bar was put therein, and the reagent bottle was placed on a hot plate with a magnetic stirrer function.

Heating and stirring were performed for 30 minutes by setting the set temperature of the hot plate to 160° C. and the rotation speed to 500 rpm.

Subsequently, 2 mL of 2-n-butoxyethanol and 2 mL of ethyl alcohol were added thereto, and heating and stirring were performed again for 30 minutes. By 30 minute-heating and stirring, which is regarded as dehydration once, and a phase inversion treatment of yttrium to 2-n-butoxyethanol, dehydration twice and a phase inversion treatment are regarded as being performed.

After dehydration and a phase inversion treatment, the reagent bottle was covered with a lid and sealed.

Subsequently, stirring was performed by setting the set temperature of the hot plate to 25° C. and the rotation speed to 500 rpm, thereby gradually cooling the reaction mixture to room temperature.

Subsequently, the reagent bottle was transferred to a dry atmosphere, and in the reagent bottle, 1.700 g of a 2-n-butoxyethanol solution of zirconium tetra-n-butoxide, 0.250 g of a 2-n-butoxyethanol solution of niobium pentaethoxide, and 0.050 g of a 2-n-butoxyethanol solution of tantalum pentaethoxide, each of which was prepared as described above, were weighed. A magnetic stirring bar was put therein.

Subsequently, stirring was performed at room temperature for 30 minutes by setting the rotation speed of a magnetic stirrer to 500 rpm, whereby a precursor solution was obtained.

Subsequently, the obtained precursor solution was placed in a dish made of titanium having an inner diameter of 50 mm and a height of 20 mm. This dish was placed on a hot plate and heated for 1 hour by setting the set temperature of the hot plate to 160° C., and then heated for 30 minutes by setting the set temperature of the hot plate to 180° C., thereby removing the solvent.

Subsequently, the dish was heated for 30 minutes by setting the set temperature of the hot plate to 360° C., thereby decomposing most of the contained organic components by combustion.

Thereafter, the dish was heated for 1 hour by setting the set temperature of the hot plate to 540° C., thereby burning and decomposing the remaining organic components. Then, the dish was gradually cooled to room temperature on the hot plate, whereby a solid composition as the calcined body was obtained.

Example 2

In this Example, a calcined body to be used in the production of a solid electrolyte represented by the formulation: $Li_{6.35}(La_{2.98}Y_{0.02})(Zr_{1.35}Nb_{0.25}Sb_{0.4})O_{12}$ was produced as follows.

First, in a reagent bottle made of Pyrex, 7.620 g of a 2-n-butoxyethanol solution of lithium nitrate, 2.980 g of a 2-n-butoxyethanol solution of lanthanum nitrate hexahydrate, and 0.020 g of an ethyl alcohol solution of yttrium nitrate hexahydrate, each of which was prepared as described above, and 2 mL of 2-n-butoxyethanol and 2 mL of ethyl alcohol as organic solvents were weighed. A magnetic stirring bar was put therein, and the reagent bottle was placed on a hot plate with a magnetic stirrer function.

Heating and stirring were performed for 30 minutes by setting the set temperature of the hot plate to 160° C. and the rotation speed to 500 rpm.

Subsequently, 2 mL of 2-n-butoxyethanol and 2 mL of ethyl alcohol were added thereto, and heating and stirring were performed again for 30 minutes.

After dehydration and a phase inversion treatment, the reagent bottle was covered with a lid and sealed.

Subsequently, stirring was performed by setting the set temperature of the hot plate to 25° C. and the rotation speed to 500 rpm, thereby gradually cooling the reaction mixture to room temperature.

Subsequently, the reagent bottle was transferred to a dry atmosphere, and in the reagent bottle, 1.350 g of a 2-n-butoxyethanol solution of zirconium tetra-n-butoxide, 0.250 g of a 2-n-butoxyethanol solution of niobium pentaethoxide, and 0.400 g of a 2-n-butoxyethanol solution of antimony tri-n-butoxide, each of which was prepared as described above, were weighed. A magnetic stirring bar was put therein.

Subsequently, stirring was performed at room temperature for 30 minutes by setting the rotation speed of a magnetic stirrer to 500 rpm, whereby a precursor solution was obtained.

Subsequently, the obtained precursor solution was placed in a dish made of titanium having an inner diameter of 50 mm and a height of 20 mm. This dish was placed on a hot plate and heated for 1 hour by setting the set temperature of the hot plate to 160° C., and then heated for 30 minutes by setting the set temperature of the hot plate to 180° C., thereby removing the solvent.

Subsequently, the dish was heated for 30 minutes by setting the set temperature of the hot plate to 360° C., thereby decomposing most of the contained organic components by combustion.

Thereafter, the dish was heated for 1 hour by setting the set temperature of the hot plate to 540° C., thereby burning and decomposing the remaining organic components. Then, the dish was gradually cooled to room temperature on the hot plate, whereby a solid composition as the calcined body was obtained.

Example 3

In this Example, a calcined body to be used in the production of a solid electrolyte represented by the formulation: $Li_{6.3}(La_{2.85}Y_{0.15})(Zr_{1.3}Sb_{0.6}Ta_{0.2})O_{12}$ was produced as follows.

First, in a reagent bottle made of Pyrex, 7.560 g of a 2-n-butoxyethanol solution of lithium nitrate, 2.850 g of a 2-n-butoxyethanol solution of lanthanum nitrate hexahydrate, and 0.150 g of an ethyl alcohol solution of yttrium nitrate hexahydrate, each of which was prepared as described above, and 2 mL of 2-n-butoxyethanol and 2 mL of ethyl alcohol as organic solvents were weighed. A magnetic stirring bar was put therein, and the reagent bottle was placed on a hot plate with a magnetic stirrer function.

Heating and stirring were performed for 30 minutes by setting the set temperature of the hot plate to 160° C. and the rotation speed to 500 rpm.

Subsequently, 2 mL of 2-n-butoxyethanol and 2 mL of ethyl alcohol were added thereto, and heating and stirring were performed again for 30 minutes.

After dehydration and a phase inversion treatment, the reagent bottle was covered with a lid and sealed.

Subsequently, stirring was performed by setting the set temperature of the hot plate to 25° C. and the rotation speed to 500 rpm, thereby gradually cooling the reaction mixture to room temperature.

Subsequently, the reagent bottle was transferred to a dry atmosphere, and in the reagent bottle, 1.300 g of a 2-n-butoxyethanol solution of zirconium tetra-n-butoxide, 0.500 g of a 2-n-butoxyethanol solution of antimony tri-n-butoxide, and 0.200 g of a 2-n-butoxyethanol solution of tantalum pentaethoxide, each of which was prepared as described above, were weighed. A magnetic stirring bar was put therein.

Subsequently, stirring was performed at room temperature for 30 minutes by setting the rotation speed of a magnetic stirrer to 500 rpm, whereby a precursor solution was obtained.

Subsequently, the obtained precursor solution was placed in a dish made of titanium having an inner diameter of 50 mm and a height of 20 mm. This dish was placed on a hot plate and heated for 1 hour by setting the set temperature of the hot plate to 160° C., and then heated for 30 minutes by setting the set temperature of the hot plate to 180° C., thereby removing the solvent.

Subsequently, the dish was heated for 30 minutes by setting the set temperature of the hot plate to 360° C., thereby decomposing most of the contained organic components by combustion.

Thereafter, the dish was heated for 1 hour by setting the set temperature of the hot plate to 540° C., thereby burning and decomposing the remaining organic components. Then, the dish was gradually cooled to room temperature on the hot plate, whereby a solid composition as the calcined body was obtained.

Example 4

In this Example, a calcined body to be used in the production of a solid electrolyte represented by the formulation: $Li_{5.95}(La_{2.93}Y_{0.07})(Zr_{0.95}Nb_{0.25}Sb_{0.4}Ta_{0.4})O_{12}$ was produced as follows.

First, in a reagent bottle made of Pyrex, 7.140 g of a 2-n-butoxyethanol solution of lithium nitrate, 2.930 g of a 2-n-butoxyethanol solution of lanthanum nitrate hexahydrate, and 0.070 g of an ethyl alcohol solution of yttrium nitrate hexahydrate, each of which was prepared as described above, and 2 mL of 2-n-butoxyethanol and 2 mL of ethyl alcohol as organic solvents were weighed. A magnetic stirring bar was put therein, and the reagent bottle was placed on a hot plate with a magnetic stirrer function.

Heating and stirring were performed for 30 minutes by setting the set temperature of the hot plate to 160° C. and the rotation speed to 500 rpm.

Subsequently, 2 mL of 2-n-butoxyethanol and 2 mL of ethyl alcohol were added thereto, and heating and stirring were performed again for 30 minutes.

After dehydration and a phase inversion treatment, the reagent bottle was covered with a lid and sealed.

Subsequently, stirring was performed by setting the set temperature of the hot plate to 25° C. and the rotation speed to 500 rpm, thereby gradually cooling the reaction mixture to room temperature.

Subsequently, the reagent bottle was transferred to a dry atmosphere, and in the reagent bottle, 0.950 g of a 2-n-butoxyethanol solution of zirconium tetra-n-butoxide, 0.250 g of a 2-n-butoxyethanol solution of niobium pentaethoxide, 0.400 g of a 2-n-butoxyethanol solution of antimony tri-n-butoxide, and 0.400 g of a 2-n-butoxyethanol solution of tantalum pentaethoxide, each of which was prepared as described above, were weighed. A magnetic stirring bar was put therein.

Subsequently, stirring was performed at room temperature for 30 minutes by setting the rotation speed of a magnetic stirrer to 500 rpm, whereby a precursor solution was obtained.

Subsequently, the obtained precursor solution was placed in a dish made of titanium having an inner diameter of 50 mm and a height of 20 mm. This dish was placed on a hot plate and heated for 1 hour by setting the set temperature of the hot plate to 160° C., and then heated for 30 minutes by setting the set temperature of the hot plate to 180° C., thereby removing the solvent.

Subsequently, the dish was heated for 30 minutes by setting the set temperature of the hot plate to 360° C., thereby decomposing most of the contained organic components by combustion.

Thereafter, the dish was heated for 1 hour by setting the set temperature of the hot plate to 540° C., thereby burning and decomposing the remaining organic components. Then, the dish was gradually cooled to room temperature on the hot plate, whereby a solid composition as the calcined body was obtained.

Example 5

In this Example, a calcined body to be used in the production of a solid electrolyte represented by the formulation: $Li_{6.2}(La_{2.95}Y_{0.05})(Zr_{1.2}Sb_{0.4}Ta_{0.4})O_{12}$ was produced as follows.

First, in a reagent bottle made of Pyrex, 7.440 g of a 2-n-butoxyethanol solution of lithium nitrate, 2.950 g of a 2-n-butoxyethanol solution of lanthanum nitrate hexahydrate, and 0.050 g of an ethyl alcohol solution of yttrium nitrate hexahydrate, each of which was prepared as described above, and 2 mL of 2-n-butoxyethanol and 2 mL of ethyl alcohol as organic solvents were weighed. A magnetic stirring bar was put therein, and the reagent bottle was placed on a hot plate with a magnetic stirrer function.

Heating and stirring were performed for 30 minutes by setting the set temperature of the hot plate to 160° C. and the rotation speed to 500 rpm.

Subsequently, 2 mL of 2-n-butoxyethanol and 2 mL of ethyl alcohol were added thereto, and heating and stirring were performed again for 30 minutes.

After dehydration and a phase inversion treatment, the reagent bottle was covered with a lid and sealed.

Subsequently, stirring was performed by setting the set temperature of the hot plate to 25° C. and the rotation speed to 500 rpm, thereby gradually cooling the reaction mixture to room temperature.

Subsequently, the reagent bottle was transferred to a dry atmosphere, and in the reagent bottle, 1.200 g of a 2-n-butoxyethanol solution of zirconium tetra-n-butoxide, 0.400 g of a 2-n-butoxyethanol solution of antimony tri-n-butoxide, and 0.400 g of a 2-n-butoxyethanol solution of tantalum pentaethoxide, each of which was prepared as described above, were weighed. A magnetic stirring bar was put therein.

Subsequently, stirring was performed at room temperature for 30 minutes by setting the rotation speed of a magnetic stirrer to 500 rpm, whereby a precursor solution was obtained.

Subsequently, the obtained precursor solution was placed in a dish made of titanium having an inner diameter of 50 mm and a height of 20 mm. This dish was placed on a hot plate and heated for 1 hour by setting the set temperature of the hot plate to 160° C., and then heated for 30 minutes by setting the set temperature of the hot plate to 180° C., thereby removing the solvent.

Subsequently, the dish was heated for 30 minutes by setting the set temperature of the hot plate to 360° C., thereby decomposing most of the contained organic components by combustion.

Thereafter, the dish was heated for 1 hour by setting the set temperature of the hot plate to 540° C., thereby burning and decomposing the remaining organic components. Then, the dish was gradually cooled to room temperature on the hot plate, whereby a solid composition as the calcined body was obtained.

Example 6

In this Example, a calcined body to be used in the production of a solid electrolyte represented by the formulation: $Li_{6.95}(La_{2.95}Y_{0.05})(Zr_{1.95}Nb_{0.01}Sb_{0.04})O_{12}$ was produced as follows.

First, in a reagent bottle made of Pyrex, 8.340 g of a 2-n-butoxyethanol solution of lithium nitrate, 2.950 g of a 2-n-butoxyethanol solution of lanthanum nitrate hexahydrate, and 0.050 g of an ethyl alcohol solution of yttrium nitrate hexahydrate, each of which was prepared as described above, and 2 mL of 2-n-butoxyethanol and 2 mL of ethyl alcohol as organic solvents were weighed. A magnetic stirring bar was put therein, and the reagent bottle was placed on a hot plate with a magnetic stirrer function.

Heating and stirring were performed for 30 minutes by setting the set temperature of the hot plate to 160° C. and the rotation speed to 500 rpm.

Subsequently, 2 mL of 2-n-butoxyethanol and 2 mL of ethyl alcohol were added thereto, and heating and stirring were performed again for 30 minutes.

After dehydration and a phase inversion treatment, the reagent bottle was covered with a lid and sealed.

Subsequently, stirring was performed by setting the set temperature of the hot plate to 25° C. and the rotation speed to 500 rpm, thereby gradually cooling the reaction mixture to room temperature.

Subsequently, the reagent bottle was transferred to a dry atmosphere, and in the reagent bottle, 1.950 g of a 2-n-butoxyethanol solution of zirconium tetra-n-butoxide, 0.010 g of a 2-n-butoxyethanol solution of niobium pentaethoxide, and 0.040 g of a 2-n-butoxyethanol solution of antimony tri-n-butoxide, each of which was prepared as described above, were weighed. A magnetic stirring bar was put therein.

Subsequently, stirring was performed at room temperature for 30 minutes by setting the rotation speed of a magnetic stirrer to 500 rpm, whereby a precursor solution was obtained.

Subsequently, the obtained precursor solution was placed in a dish made of titanium having an inner diameter of 50 mm and a height of 20 mm. This dish was placed on a hot plate and heated for 1 hour by setting the set temperature of the hot plate to 160° C., and then heated for 30 minutes by setting the set temperature of the hot plate to 180° C., thereby removing the solvent.

Subsequently, the dish was heated for 30 minutes by setting the set temperature of the hot plate to 360° C., thereby decomposing most of the contained organic components by combustion.

Thereafter, the dish was heated for 1 hour by setting the set temperature of the hot plate to 540° C., thereby burning and decomposing the remaining organic components. Then, the dish was gradually cooled to room temperature on the hot plate, whereby a solid composition as the calcined body was obtained.

Example 7

In this Example, a calcined body to be used in the production of a solid electrolyte represented by the formulation: $Li_{5.95}(La_{2.85}Y_{0.15})(Zr_{0.95}Nb_{0.25}Sb_{0.5}Ta_{0.3})O_{12}$ was produced as follows.

First, in a reagent bottle made of Pyrex, 7.140 g of a 2-n-butoxyethanol solution of lithium nitrate, 2.850 g of a 2-n-butoxyethanol solution of lanthanum nitrate hexahydrate, and 0.150 g of an ethyl alcohol solution of yttrium nitrate hexahydrate, each of which was prepared as described above, and 2 mL of 2-n-butoxyethanol and 2 mL of ethyl alcohol as organic solvents were weighed. A magnetic stirring bar was put therein, and the reagent bottle was placed on a hot plate with a magnetic stirrer function.

Heating and stirring were performed for 30 minutes by setting the set temperature of the hot plate to 160° C. and the rotation speed to 500 rpm.

Subsequently, 2 mL of 2-n-butoxyethanol and 2 mL of ethyl alcohol were added thereto, and heating and stirring were performed again for 30 minutes.

After dehydration and a phase inversion treatment, the reagent bottle was covered with a lid and sealed.

Subsequently, stirring was performed by setting the set temperature of the hot plate to 25° C. and the rotation speed to 500 rpm, thereby gradually cooling the reaction mixture to room temperature.

Subsequently, the reagent bottle was transferred to a dry atmosphere, and in the reagent bottle, 0.950 g of a 2-n-butoxyethanol solution of zirconium tetra-n-butoxide, 0.250 g of a 2-n-butoxyethanol solution of niobium pentaethoxide, 0.500 g of a 2-n-butoxyethanol solution of antimony tri-n-butoxide, and 0.300 g of a 2-n-butoxyethanol solution of tantalum pentaethoxide, each of which was prepared as described above, were weighed. A magnetic stirring bar was put therein.

Subsequently, stirring was performed at room temperature for 30 minutes by setting the rotation speed of a magnetic stirrer to 500 rpm, whereby a precursor solution was obtained.

Subsequently, the obtained precursor solution was placed in a dish made of titanium having an inner diameter of 50 mm and a height of 20 mm. This dish was placed on a hot plate and heated for 1 hour by setting the set temperature of the hot plate to 160° C., and then heated for 30 minutes by setting the set temperature of the hot plate to 180° C., thereby removing the solvent.

Subsequently, the dish was heated for 30 minutes by setting the set temperature of the hot plate to 360° C., thereby decomposing most of the contained organic components by combustion.

Thereafter, the dish was heated for 1 hour by setting the set temperature of the hot plate to 540° C., thereby burning and decomposing the remaining organic components. Then, the dish was gradually cooled to room temperature on the hot plate, whereby a solid composition as the calcined body was obtained.

Example 8

In this Example, a calcined body to be used in the production of a solid electrolyte represented by the formulation: $Li_{6.45}(La_{2.92}Y_{0.08})(Zr_{1.45}Nb_{0.3}Ta_{0.25})O_{12}$ was produced as follows.

First, in a reagent bottle made of Pyrex, 7.740 g of a 2-n-butoxyethanol solution of lithium nitrate, 2.920 g of a 2-n-butoxyethanol solution of lanthanum nitrate hexahydrate, and 0.080 g of an ethyl alcohol solution of yttrium nitrate hexahydrate, each of which was prepared as described above, and 2 mL of 2-n-butoxyethanol and 2 mL of ethyl alcohol as organic solvents were weighed. A magnetic stirring bar was put therein, and the reagent bottle was placed on a hot plate with a magnetic stirrer function.

Heating and stirring were performed for 30 minutes by setting the set temperature of the hot plate to 160° C. and the rotation speed to 500 rpm.

Subsequently, 2 mL of 2-n-butoxyethanol and 2 mL of ethyl alcohol were added thereto, and heating and stirring were performed again for 30 minutes.

After dehydration and a phase inversion treatment, the reagent bottle was covered with a lid and sealed.

Subsequently, stirring was performed by setting the set temperature of the hot plate to 25° C. and the rotation speed to 500 rpm, thereby gradually cooling the reaction mixture to room temperature.

Subsequently, the reagent bottle was transferred to a dry atmosphere, and in the reagent bottle, 1.450 g of a 2-n-butoxyethanol solution of zirconium tetra-n-butoxide, 0.300 g of a 2-n-butoxyethanol solution of niobium pentaethoxide, and 0.250 g of a 2-n-butoxyethanol solution of tantalum pentaethoxide, each of which was prepared as described above, were weighed. A magnetic stirring bar was put therein.

Subsequently, stirring was performed at room temperature for 30 minutes by setting the rotation speed of a magnetic stirrer to 500 rpm, whereby a precursor solution was obtained.

Subsequently, the obtained precursor solution was placed in a dish made of titanium having an inner diameter of 50 mm and a height of 20 mm. This dish was placed on a hot plate and heated for 1 hour by setting the set temperature of the hot plate to 160° C., and then heated for 30 minutes by setting the set temperature of the hot plate to 180° C., thereby removing the solvent.

Subsequently, the dish was heated for 30 minutes by setting the set temperature of the hot plate to 360° C., thereby decomposing most of the contained organic components by combustion.

Thereafter, the dish was heated for 1 hour by setting the set temperature of the hot plate to 540° C., thereby burning and decomposing the remaining organic components. Then, the dish was gradually cooled to room temperature on the hot plate, whereby a solid composition as the calcined body was obtained.

Comparative Example 1

In this Comparative Example, a calcined body to be used in the production of a solid electrolyte represented by the formulation: $Li_{6.7}La_3(Zr_{1.7}Nb_{0.25}Ta_{0.05})O_{12}$ was produced as follows.

First, in a reagent bottle made of Pyrex, 8.040 g of a 2-n-butoxyethanol solution of lithium nitrate and 3.000 g of a 2-n-butoxyethanol solution of lanthanum nitrate hexahydrate, each of which was prepared as described above, and 2 mL of 2-n-butoxyethanol and 2 mL of ethyl alcohol as organic solvents were weighed. A magnetic stirring bar was put therein, and the reagent bottle was placed on a hot plate with a magnetic stirrer function.

Heating and stirring were performed for 30 minutes by setting the set temperature of the hot plate to 160° C. and the rotation speed to 500 rpm.

Subsequently, 2 mL of 2-n-butoxyethanol and 2 mL of ethyl alcohol were added thereto, and heating and stirring were performed again for 30 minutes.

After dehydration and a phase inversion treatment, the reagent bottle was covered with a lid and sealed.

Subsequently, stirring was performed by setting the set temperature of the hot plate to 25° C. and the rotation speed to 500 rpm, thereby gradually cooling the reaction mixture to room temperature.

Subsequently, the reagent bottle was transferred to a dry atmosphere, and in the reagent bottle, 1.700 g of a 2-n-butoxyethanol solution of zirconium tetra-n-butoxide, 0.250 g of a 2-n-butoxyethanol solution of niobium pentaethoxide, and 0.050 g of a 2-n-butoxyethanol solution of tantalum pentaethoxide, each of which was prepared as described above, were weighed. A magnetic stirring bar was put therein.

Subsequently, stirring was performed at room temperature for 30 minutes by setting the rotation speed of a magnetic stirrer to 500 rpm, whereby a precursor solution was obtained.

Subsequently, the obtained precursor solution was placed in a dish made of titanium having an inner diameter of 50 mm and a height of 20 mm. This dish was placed on a hot plate and heated for 1 hour by setting the set temperature of the hot plate to 160° C., and then heated for 30 minutes by setting the set temperature of the hot plate to 180° C., thereby removing the solvent.

Subsequently, the dish was heated for 30 minutes by setting the set temperature of the hot plate to 360° C., thereby decomposing most of the contained organic components by combustion.

Thereafter, the dish was heated for 1 hour by setting the set temperature of the hot plate to 540° C., thereby burning and decomposing the remaining organic components. Then, the dish was gradually cooled to room temperature on the hot plate, whereby a solid composition as the calcined body was obtained.

Comparative Example 2

In this Comparative Example, a calcined body to be used in the production of a solid electrolyte represented by the formulation: $Li_{6.35}La_3(Zr_{1.35}Nb_{0.25}Sb_{0.4})O_{12}$ was produced as follows.

First, in a reagent bottle made of Pyrex, 7.620 g of a 2-n-butoxyethanol solution of lithium nitrate and 2.980 g of a 2-n-butoxyethanol solution of lanthanum nitrate hexahydrate, each of which was prepared as described above, and 2 mL of 2-n-butoxyethanol and 2 mL of ethyl alcohol as organic solvents were weighed. A magnetic stirring bar was put therein, and the reagent bottle was placed on a hot plate with a magnetic stirrer function.

Heating and stirring were performed for 30 minutes by setting the set temperature of the hot plate to 160° C. and the rotation speed to 500 rpm.

Subsequently, 2 mL of 2-n-butoxyethanol and 2 mL of ethyl alcohol were added thereto, and heating and stirring were performed again for 30 minutes.

After dehydration and a phase inversion treatment, the reagent bottle was covered with a lid and sealed.

Subsequently, stirring was performed by setting the set temperature of the hot plate to 25° C. and the rotation speed to 500 rpm, thereby gradually cooling the reaction mixture to room temperature.

Subsequently, the reagent bottle was transferred to a dry atmosphere, and in the reagent bottle, 1.350 g of a 2-n-butoxyethanol solution of zirconium tetra-n-butoxide, 0.250 g of a 2-n-butoxyethanol solution of niobium pentaethoxide, and 0.400 g of a 2-n-butoxyethanol solution of antimony tri-n-butoxide, each of which was prepared as described above, were weighed. A magnetic stirring bar was put therein.

Subsequently, stirring was performed at room temperature for 30 minutes by setting the rotation speed of a magnetic stirrer to 500 rpm, whereby a precursor solution was obtained.

Subsequently, the obtained precursor solution was placed in a dish made of titanium having an inner diameter of 50 mm and a height of 20 mm. This dish was placed on a hot plate and heated for 1 hour by setting the set temperature of the hot plate to 160° C., and then heated for 30 minutes by setting the set temperature of the hot plate to 180° C., thereby removing the solvent.

Subsequently, the dish was heated for 30 minutes by setting the set temperature of the hot plate to 360° C., thereby decomposing most of the contained organic components by combustion.

Thereafter, the dish was heated for 1 hour by setting the set temperature of the hot plate to 540° C., thereby burning and decomposing the remaining organic components. Then, the dish was gradually cooled to room temperature on the hot plate, whereby a solid composition as the calcined body was obtained.

Comparative Example 3

In this Comparative Example, a calcined body to be used in the production of a solid electrolyte represented by the formulation: $Li_{5.95}La_3(Zr_{0.95}Nb_{0.25}Sb_{0.4}Ta_{0.4})O_{12}$ was produced as follows.

First, in a reagent bottle made of Pyrex, 7.140 g of a 2-n-butoxyethanol solution of lithium nitrate and 2.930 g of a 2-n-butoxyethanol solution of lanthanum nitrate hexahydrate, each of which was prepared as described above, and 2 mL of 2-n-butoxyethanol and 2 mL of ethyl alcohol as organic solvents were weighed. A magnetic stirring bar was put therein, and the reagent bottle was placed on a hot plate with a magnetic stirrer function.

Heating and stirring were performed for 30 minutes by setting the set temperature of the hot plate to 160° C. and the rotation speed to 500 rpm.

Subsequently, 2 mL of 2-n-butoxyethanol and 2 mL of ethyl alcohol were added thereto, and heating and stirring were performed again for 30 minutes.

After dehydration and a phase inversion treatment, the reagent bottle was covered with a lid and sealed.

Subsequently, stirring was performed by setting the set temperature of the hot plate to 25° C. and the rotation speed to 500 rpm, thereby gradually cooling the reaction mixture to room temperature.

Subsequently, the reagent bottle was transferred to a dry atmosphere, and in the reagent bottle, 0.950 g of a 2-n-butoxyethanol solution of zirconium tetra-n-butoxide, 0.250 g of a 2-n-butoxyethanol solution of niobium pentaethoxide, 0.400 g of a 2-n-butoxyethanol solution of antimony tri-n-butoxide, and 0.400 g of a 2-n-butoxyethanol solution of tantalum pentaethoxide, each of which was prepared as described above, were weighed. A magnetic stirring bar was put therein.

Subsequently, stirring was performed at room temperature for 30 minutes by setting the rotation speed of a magnetic stirrer to 500 rpm, whereby a precursor solution was obtained.

Subsequently, the obtained precursor solution was placed in a dish made of titanium having an inner diameter of 50 mm and a height of 20 mm. This dish was placed on a hot plate and heated for 1 hour by setting the set temperature of the hot plate to 160° C., and then heated for 30 minutes by setting the set temperature of the hot plate to 180° C., thereby removing the solvent.

Subsequently, the dish was heated for 30 minutes by setting the set temperature of the hot plate to 360° C., thereby decomposing most of the contained organic components by combustion.

Thereafter, the dish was heated for 1 hour by setting the set temperature of the hot plate to 540° C., thereby burning and decomposing the remaining organic components. Then, the dish was gradually cooled to room temperature on the hot plate, whereby a solid composition as the calcined body was obtained.

Comparative Example 4

In this Comparative Example, a calcined body to be used in the production of a solid electrolyte represented by the formulation: $Li_{5.9}(La_{2.95}Y_{0.05})(Zr_{0.9}Nb_{0.4}Sb_{0.5}Ta_{0.2})O_{12}$ was produced as follows.

First, in a reagent bottle made of Pyrex, 7.080 g of a 2-n-butoxyethanol solution of lithium nitrate, 2.950 g of a 2-n-butoxyethanol solution of lanthanum nitrate hexahydrate, and 0.050 g of an ethyl alcohol solution of yttrium nitrate hexahydrate, each of which was prepared as described above, and 2 mL of 2-n-butoxyethanol and 2 mL of ethyl alcohol as organic solvents were weighed. A magnetic stirring bar was put therein, and the reagent bottle was placed on a hot plate with a magnetic stirrer function.

Heating and stirring were performed for 30 minutes by setting the set temperature of the hot plate to 160° C. and the rotation speed to 500 rpm.

Subsequently, 2 mL of 2-n-butoxyethanol and 2 mL of ethyl alcohol were added thereto, and heating and stirring were performed again for 30 minutes.

After dehydration and a phase inversion treatment, the reagent bottle was covered with a lid and sealed.

Subsequently, stirring was performed by setting the set temperature of the hot plate to 25° C. and the rotation speed to 500 rpm, thereby gradually cooling the reaction mixture to room temperature.

Subsequently, the reagent bottle was transferred to a dry atmosphere, and in the reagent bottle, 0.900 g of a 2-n-butoxyethanol solution of zirconium tetra-n-butoxide, 0.400 g of a 2-n-butoxyethanol solution of niobium pentaethoxide, 0.500 g of a 2-n-butoxyethanol solution of antimony tri-n-butoxide, and 0.200 g of a 2-n-butoxyethanol solution of tantalum pentaethoxide, each of which was prepared as described above, were weighed. A magnetic stirring bar was put therein.

Subsequently, stirring was performed at room temperature for 30 minutes by setting the rotation speed of a magnetic stirrer to 500 rpm, whereby a precursor solution was obtained.

Subsequently, the obtained precursor solution was placed in a dish made of titanium having an inner diameter of 50 mm and a height of 20 mm. This dish was placed on a hot plate and heated for 1 hour by setting the set temperature of the hot plate to 160° C., and then heated for 30 minutes by setting the set temperature of the hot plate to 180° C., thereby removing the solvent.

Subsequently, the dish was heated for 30 minutes by setting the set temperature of the hot plate to 360° C., thereby decomposing most of the contained organic components by combustion.

Thereafter, the dish was heated for 1 hour by setting the set temperature of the hot plate to 540° C., thereby burning and decomposing the remaining organic components. Then, the dish was gradually cooled to room temperature on the hot plate, whereby a solid composition as the calcined body was obtained.

Comparative Example 5

In this Comparative Example, a calcined body to be used in the production of a solid electrolyte represented by the formulation: $Li_{6.00}(La_{2.95}Y_{0.05})(Zr_{1.00}Sb_{1.00})O_{12}$ was produced as follows.

First, in a reagent bottle made of Pyrex, 7.800 g of a 2-n-butoxyethanol solution of lithium nitrate, 2.950 g of a 2-n-butoxyethanol solution of lanthanum nitrate hexahydrate, and 0.050 g of an ethyl alcohol solution of yttrium nitrate hexahydrate, each of which was prepared as described above, and 2 mL of 2-n-butoxyethanol and 2 mL of ethyl alcohol as organic solvents were weighed. A magnetic stirring bar was put therein, and the reagent bottle was placed on a hot plate with a magnetic stirrer function.

Heating and stirring were performed for 30 minutes by setting the set temperature of the hot plate to 160° C. and the rotation speed to 500 rpm.

Subsequently, 2 mL of 2-n-butoxyethanol and 2 mL of ethyl alcohol were added thereto, and heating and stirring were performed again for 30 minutes.

After dehydration and a phase inversion treatment, the reagent bottle was covered with a lid and sealed.

Subsequently, stirring was performed by setting the set temperature of the hot plate to 25° C. and the rotation speed to 500 rpm, thereby gradually cooling the reaction mixture to room temperature.

Subsequently, the reagent bottle was transferred to a dry atmosphere, and in the reagent bottle, 1.000 g of a 2-n-butoxyethanol solution of zirconium tetra-n-butoxide and 1.000 g of a 2-n-butoxyethanol solution of antimony tri-n-butoxide, each of which was prepared as described above, were weighed. A magnetic stirring bar was put therein.

Subsequently, stirring was performed at room temperature for 30 minutes by setting the rotation speed of a magnetic stirrer to 500 rpm, whereby a precursor solution was obtained.

Subsequently, the obtained precursor solution was placed in a dish made of titanium having an inner diameter of 50 mm and a height of 20 mm. This dish was placed on a hot plate and heated for 1 hour by setting the set temperature of the hot plate to 160° C., and then heated for 30 minutes by setting the set temperature of the hot plate to 180° C., thereby removing the solvent.

Subsequently, the dish was heated for 30 minutes by setting the set temperature of the hot plate to 360° C., thereby decomposing most of the contained organic components by combustion.

Thereafter, the dish was heated for 1 hour by setting the set temperature of the hot plate to 540° C., thereby burning and decomposing the remaining organic components. Then, the dish was gradually cooled to room temperature on the hot plate, whereby a solid composition as the calcined body was obtained.

Comparative Example 6

In this Comparative Example, a calcined body to be used in the production of a solid electrolyte represented by the formulation: $Li_{6.30}(La_{2.80}Y_{0.20})(Zr_{1.30}Sb_{0.50}Ta_{0.20})O_{12}$ was produced as follows.

First, in a reagent bottle made of Pyrex, 7.560 g of a 2-n-butoxyethanol solution of lithium nitrate, 2.800 g of a 2-n-butoxyethanol solution of lanthanum nitrate hexahydrate, and 0.200 g of an ethyl alcohol solution of yttrium nitrate hexahydrate, each of which was prepared as described above, and 2 mL of 2-n-butoxyethanol and 2 mL of ethyl alcohol as organic solvents were weighed. A magnetic stirring bar was put therein, and the reagent bottle was placed on a hot plate with a magnetic stirrer function.

Heating and stirring were performed for 30 minutes by setting the set temperature of the hot plate to 160° C. and the rotation speed to 500 rpm.

Subsequently, 2 mL of 2-n-butoxyethanol and 2 mL of ethyl alcohol were added thereto, and heating and stirring were performed again for 30 minutes.

After dehydration and a phase inversion treatment, the reagent bottle was covered with a lid and sealed.

Subsequently, stirring was performed by setting the set temperature of the hot plate to 25° C. and the rotation speed to 500 rpm, thereby gradually cooling the reaction mixture to room temperature.

Subsequently, the reagent bottle was transferred to a dry atmosphere, and in the reagent bottle, 1.300 g of a 2-n-butoxyethanol solution of zirconium tetra-n-butoxide, 0.500 g of a 2-n-butoxyethanol solution of antimony tri-n-butoxide, and 0.200 g of a 2-n-butoxyethanol solution of tantalum pentaethoxide, each of which was prepared as described above, were weighed. A magnetic stirring bar was put therein.

Subsequently, stirring was performed at room temperature for 30 minutes by setting the rotation speed of a magnetic stirrer to 500 rpm, whereby a precursor solution was obtained.

Subsequently, the obtained precursor solution was placed in a dish made of titanium having an inner diameter of 50 mm and a height of 20 mm. This dish was placed on a hot plate and heated for 1 hour by setting the set temperature of the hot plate to 160° C., and then heated for 30 minutes by setting the set temperature of the hot plate to 180° C., thereby removing the solvent.

Subsequently, the dish was heated for 30 minutes by setting the set temperature of the hot plate to 360° C., thereby decomposing most of the contained organic components by combustion.

Thereafter, the dish was heated for 1 hour by setting the set temperature of the hot plate to 540° C., thereby burning and decomposing the remaining organic components. Then, the dish was gradually cooled to room temperature on the hot plate, whereby a solid composition as the calcined body was obtained.

[6-3] Production of Solid Electrolyte

Solid electrolytes were produced as follows using the calcined bodies according to the respective Examples and the respective Comparative Examples obtained as described above, respectively.

First, the calcined body was transferred to an agate mortar and sufficiently ground. A 0.150 g portion of the thus obtained ground material of the calcined body was weighed out and placed in a pellet die with an exhaust port having an inner diameter of 10 mm as a molding die, pressed at a pressure of 0.624 kN/mm$^2$ for 5 minutes, whereby a calcined body pellet that is a disk-shaped molded material was produced.

Then, the calcined body pellet was placed in a crucible made of magnesium oxide, the crucible was covered with a lid made of magnesium oxide, and then, the pellet was subjected to main firing in an electric muffle furnace FP311 manufactured by Yamato Scientific Co., Ltd. The main firing conditions were set to 900° C. and 8 hours. Subsequently, the electric muffle furnace was gradually cooled to room temperature, and then, the disk-shaped solid electrolyte having a diameter of about 9.5 mm and a thickness of about 600 μm was taken out from the crucible.

The formulation and the crystal phase of each of the solid electrolytes of the respective Examples and the respective Comparative Examples are collectively shown in Table 1. The crystal phase of the solid electrolyte was specified from an X-ray diffraction pattern obtained by the measurement using an X-ray diffractometer X'Pert-PRO manufactured by Koninklijke Philips N.V. In Table 1, a tetragonal crystal structure is denoted by "t", and a cubic crystal structure is denoted by "C". Note that the content of the oxoacid compound in each of the solid electrolytes of the respective Examples and the respective Comparative Examples was 10 ppm or less. Further, the content of the solvent in each of the calcined bodies according to the respective Examples and the respective Comparative Examples was 0.1 mass % or less. In addition, when a portion of each of the calcined bodies according to the respective Examples was measured by TG-DTA at a temperature raising rate of 10° C./min, only one exothermic peak was observed in a range of 300° C. or higher and 1,000° C. or lower in all the cases. From the results, it can be said that the calcined bodies according to the respective Examples are constituted by a substantially single crystal phase.

[6-4] Evaluation of Solid Electrolyte

[6-4-1] Evaluation of Total Lithium Ion Conductivity

With respect to each of the disk-shaped solid electrolytes of the respective Examples and the respective Comparative Examples immediately after production, a circular lithium metal foil having a diameter of 5 mm was pressed against both faces, whereby activated electrodes were formed.

Then, an electrochemical impedance was measured using an AC impedance analyzer Solartron 1260 (manufactured by Solartron Analytical, Inc.), and the total lithium ion conductivity was determined. Further, with respect to the respective Examples and the respective Comparative Examples, also 24 hours after the production of the solid electrolyte, an electrochemical impedance was measured and the total lithium ion conductivity was determined in the same manner as described above.

The measurement of the electrochemical impedance was performed at an AC amplitude of 10 mV in a frequency range from $10^7$ Hz to $10^{-1}$ Hz. The total lithium ion conductivity obtained by the measurement of the electrochemical impedance includes the bulk lithium ion conductivity and the grain boundary lithium ion conductivity in the solid electrolyte.

These results are collectively shown in Table 2.

TABLE 2

| | Total lithium ion conductivity [S · cm$^{-1}$] | |
| --- | --- | --- |
| | Immediately after production | 24 hours after production |
| Example 1 | $1.0 \times 10^{-3}$ | $1.0 \times 10^{-3}$ |
| Example 2 | $6.8 \times 10^{-4}$ | $6.8 \times 10^{-4}$ |
| Example 3 | $7.0 \times 10^{-4}$ | $7.0 \times 10^{-4}$ |
| Example 4 | $6.6 \times 10^{-4}$ | $6.6 \times 10^{-4}$ |
| Example 5 | $6.6 \times 10^{-4}$ | $6.6 \times 10^{-4}$ |
| Example 6 | $6.0 \times 10^{-4}$ | $6.0 \times 10^{-4}$ |
| Example 7 | $6.7 \times 10^{-4}$ | $6.7 \times 10^{-4}$ |
| Example 8 | $6.9 \times 10^{-4}$ | $6.9 \times 10^{-4}$ |
| Comparative Example 1 | $1.0 \times 10^{-3}$ | insulator behavior |
| Comparative Example 2 | $6.8 \times 10^{-4}$ | insulator behavior |

TABLE 1

| | Value of x in compositional formula (1) | Value of z in compositional formula (1) | Formulation of solid electrolyte | Crystal phase |
| --- | --- | --- | --- | --- |
| Example 1 | 0.30 | 0.05 | $Li_{6.7}(La_{2.95}Y_{0.05})(Zr_{1.7}Nb_{0.25}Ta_{0.05})O_{12}$ | C |
| Example 2 | 0.65 | 0.02 | $Li_{6.35}(La_{2.98}Y_{0.02})(Zr_{1.35}Nb_{0.25}Sb_{0.4})O_{12}$ | C |
| Example 3 | 0.70 | 0.15 | $Li_{6.3}(La_{2.85}Y_{0.15})(Zr_{1.3}Sb_{0.5}Ta_{0.2})O_{12}$ | C |
| Example 4 | 1.05 | 0.07 | $Li_{5.95}(La_{2.93}Y_{0.07})(Zr_{0.95}Nb_{0.25}Sb_{0.4}Ta_{0.4})O_{12}$ | C |
| Example 5 | 0.80 | 0.05 | $Li_{6.2}(La_{2.95}Y_{0.05})(Zr_{1.2}Sb_{0.4}Ta_{0.4})O_{12}$ | C |
| Example 6 | 0.05 | 0.05 | $Li_{6.95}(La_{2.95}Y_{0.05})(Zr_{1.95}Nb_{0.01}Sb_{0.04})O_{12}$ | C |
| Example 7 | 1.05 | 0.15 | $Li_{5.95}(La_{2.85}Y_{0.15})(Zr_{0.95}Nb_{0.25}Sb_{0.5}Ta_{0.3})O_{12}$ | C |
| Example 8 | 0.55 | 0.08 | $Li_{6.45}(La_{2.92}Y_{0.08})(Zr_{1.45}Nb_{0.3}Ta_{0.25})O_{12}$ | C |
| Comparative Example 1 | 0.30 | 0.00 | $Li_{6.7}La_3(Zr_{1.7}Nb_{0.25}Ta_{0.05})O_{12}$ | C |
| Comparative Example 2 | 0.65 | 0.00 | $Li_{6.35}La_3(Zr_{1.35}Nb_{0.25}Sb_{0.4})O_{12}$ | C |
| Comparative Example 3 | 1.05 | 0.00 | $Li_{5.95}La_3(Zr_{0.95}Nb_{0.25}Sb_{0.4}Ta_{0.4})O_{12}$ | C |
| Comparative Example 4 | 1.10 | 0.05 | $Li_{5.9}(La_{2.95}Y_{0.05})(Zr_{0.9}Nb_{0.4}Sb_{0.5}Ta_{0.2})O_{12}$ | C |
| Comparative Example 5 | 1.00 | 0.05 | $Li_{6.00}(La_{2.95}Y_{0.05})(Zr_{1.00}Sb_{1.00})O_{12}$ | C |
| Comparative Example 6 | 0.70 | 0.20 | $Li_{6.30}(La_{2.80}Y_{0.20})(Zr_{1.30}Sb_{0.50}Ta_{0.20})O_{12}$ | C |

TABLE 2-continued

| | Total lithium ion conductivity [S · cm$^{-1}$] | |
|---|---|---|
| | Immediately after production | 24 hours after production |
| Comparative Example 3 | 6.6 × 10$^{-4}$ | insulator behavior |
| Comparative Example 4 | 5.4 × 10$^{-5}$ | 5.4 × 10$^{-5}$ |
| Comparative Example 5 | 2.5 × 10$^{-5}$ | 2.5 × 10$^{-5}$ |
| Comparative Example 6 | 3.0 × 10$^{-5}$ | 3.0 × 10$^{-5}$ |

As apparent from Table 2, Examples 1 to 8 in which Y was contained at a predetermined ratio each had an excellent conductivity immediately after production, and also maintained the excellent conductivity even after being left in the atmosphere for 24 hours. On the other hand, in Comparative Examples 1 to 3 which was not doped with Y, an insulator behavior was exhibited, and a conductivity could not be obtained. Further, in Comparative Example 4 in which the content of M was too high, the initial conductivity was maintained even after being left in the atmosphere for 24 hours, but the initial lithium ion bulk conductivity was less than 1.0×10$^{-4}$ S·cm$^{-1}$, while the initial lithium ion bulk conductivity was 5×10$^{-4}$ S·cm$^{-1}$ or more in the respective Examples, and the lithium ion bulk conductivity was low. Similarly, also in Comparative Example 5 in which only one type of element was contained as M, and Comparative Example 6 in which the content of Y in the solid electrolyte was too high, although the initial conductivity was maintained even after being left in the atmosphere for 24 hours, the initial conductivity itself was low.

[6-4-2] Evaluation of Potential Window

With respect to each of the disk-shaped solid electrolytes of the respective Examples immediately after production, a lithium metal foil was bonded to one face and a copper foil was bonded to the other face, and the resultant was used as an electrochemical measurement cell. The CV measurement was performed using an electrochemical measurement device AUTOLAB (manufactured by Metrohm Autolab, Inc.). A reference electrode and a counter electrode were coupled to the lithium metal foil, and also a working electrode was coupled to the copper foil. The potential (−3.06 V vs. SHE) of the lithium metal was set to 0 V, and a response current was measured while sweeping the potential at a rate of 0.04 V/sec in a range from −1 to 5 V.

Figure 20:
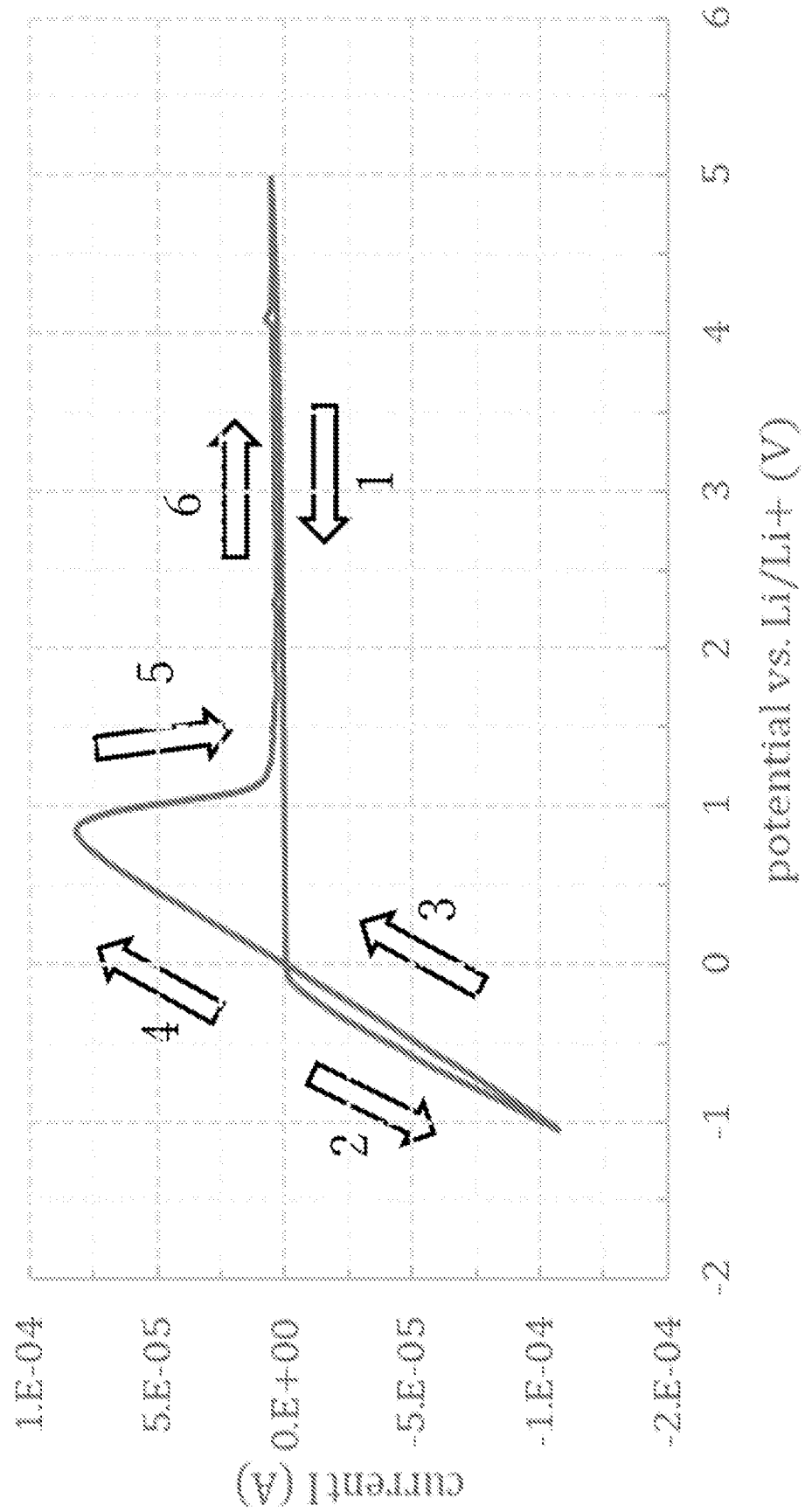
FIG. 20 is a view schematically showing a sweep potential-response current graph obtained by CV measurement.

The CV measurement was performed, and a sweep potential-response current in the second cycle in which the lithium ion concentration distribution is equilibrated was plotted as shown in FIG. 20. As a result of the measurement, two peaks were observed in the redox response current, and a reduction current for reducing and depositing a lithium ion as lithium metal when the potential sweep direction is 0→1 V, and an oxidation current accompanying the ionization of lithium metal when the potential sweep direction is 0→1 V seemed to correspond to the respective peaks. Although a slight deviation from a potential of 0 V is observed in both currents, it is inferred that this is caused by activation energy accompanying a redox reaction or an overvoltage including an interface resistance with an electrode or an ohmic drop.

On the other hand, the response current other than the redox of lithium metal was less than the detection limit between −1 and 5 V, and therefore, the solid electrolytes of the respective Examples are each considered to be a stable solid electrolyte which conducts only lithium ions at 0 to 4 V (vs. SHE) that is the working potential range of the battery.

Incidentally, it is considered that a peak in the vicinity of No. 2 to No. 3 in the CV curve shown in FIG. 20 represents a reduction deposition current from a lithium ion to lithium metal, and a peak in the vicinity of No. 4 to No. 5 represents an oxidation dissolution current for ionizing and dissolving lithium metal. A peak current attributed to a redox response current of a crystal component itself of each of the solid electrolytes of the respective Examples is not observed. Note that at a potential at which lithium ion ⇔ lithium metal occurs, a battery operation is not practically performed.

[7] Production of Solid Electrolyte-Coated Positive Electrode Active Material Powder Example 9

A precursor solution prepared in the same manner as described in the above Example 1, and LiCoO$_2$ particles as a positive electrode active material for a lithium-ion secondary battery were prepared and mixed at a predetermined ratio, and then, subjected to ultrasonic dispersion for 2 hours at 55° C. under the conditions of an oscillation frequency of 38 kHz and an output of 80 W using an ultrasonic cleaner with a temperature adjusting function, US-1 manufactured by AS ONE Corporation.

Thereafter, the resultant was centrifuged at 10,000 rpm for 3 minutes using a centrifuge, and the supernatant was removed.

The obtained precipitate was transferred to a crucible made of magnesium oxide, the crucible was covered with a lid, and by using an atmosphere controlled furnace, while supplying dry air at a flow rate of 1 L/min, the precipitate was fired at 360° C. for 30 minutes, and thereafter fired at 540° C. for 1 hour, and thereafter fired at 900° C. for 3 hours, and then, cooled to room temperature. By doing this, a solid electrolyte-coated positive electrode active material powder containing many constituent particles in which the LiCoO$_2$ particles that are base particles were each coated with a coating layer constituted by a garnet-type solid electrolyte represented by Li$_{6.7}$(La$_{2.95}$Y$_{0.05}$)(Zr$_{1.7}$Nb$_{0.25}$Ta$_{0.05}$)O$_{12}$ was obtained.

Examples 10 and 11

Solid electrolyte-coated positive electrode active material powders were produced in the same manner as in the above Example 9 except that the thickness of the coating layer was changed by adjusting the mixing ratio of the precursor solution and the LiCoO$_2$ particles.

Example 12

A solid electrolyte-coated positive electrode active material powder was produced in the same manner as in the above Example 11 except that LiNi$_{0.5}$Co$_{0.2}$Mn$_{0.3}$O$_2$ particles were used in place of the LiCoO$_2$ particles as the positive electrode active material for a lithium-ion secondary battery.

Comparative Example 7

In this Comparative Example, a coating layer was not formed for LiCoO$_2$ particles as the positive electrode active material for a lithium-ion secondary battery, and an aggregate of the LiCoO$_2$ particles were directly used as a positive electrode active material powder. In other words, a positive electrode active material powder that is not coated with a solid electrolyte was prepared in place of a solid electrolyte-coated positive electrode active material powder.

Comparative Example 8

By using a sputtering device, a coating layer constituted by LiNbO$_3$ that is a solid electrolyte was deposited to a thickness of 4 nm at surfaces of $LiCoO_2$ particles as the positive electrode active material for a lithium-ion secondary battery, whereby a solid electrolyte-coated positive electrode active material powder was prepared.

Comparative Example 9

In this Comparative Example, a coating layer was not formed for $LiNi_{0.5}Co_{0.2}Mn_{0.3}O_2$ particles as the positive electrode active material for a lithium-ion secondary battery, and an aggregate of the $LiNi_{0.5}Co_{0.2}Mn_{0.3}O_2$ particles were directly used as a positive electrode active material powder. In other words, a positive electrode active material powder that is not coated with a solid electrolyte was prepared in place of a solid electrolyte-coated positive electrode active material powder.

In all the solid electrolyte-coated positive electrode active material powders according to Examples 9 to 12 and Comparative Example 8 and the positive electrode active material powders according to Comparative Examples 7 and 9 obtained as described above, the content of the solvent was 0.1 mass % or less, and the content of oxoanions was 100 ppm or less. Further, when reflection electron images were obtained by measurement using a field-emission scanning electron microscope with EDS (manufactured by JEOL Ltd.), none was observed at the surface of the positive electrode active material powder in which a coating layer was not formed.

In the case of the constituent particles of the solid electrolyte-coated positive electrode active material powder in which the coating layer of $Li_{6.7}(La_{2.95}Y_{0.05})(Zr_{1.7}Nb_{0.25}Ta_{0.05})O_{12}$ was formed at the surfaces of the $LiCoO_2$ particles, a white contrast was observed at the surfaces. As the concentration increased, the white contrast increased. This is considered to be $Li_{6.7}(La_{2.95}Y_{0.05})(Zr_{1.7}Nb_{0.25}Ta_{0.05})O_{12}$ generated from the precursor. From an X-ray diffractometer, only a diffraction line attributed to $LiCoO_2$ was confirmed in each particle, and therefore, the film thickness of the coating layer is considered to be thin to such an extent that the diffraction intensity derived from $Li_{6.7}(La_{2.95}Y_{0.05})(Zr_{1.7}Nb_{0.25}Ta_{0.05})O_{12}$ is below the lower detection limit. According to the above field-emission scanning electron microscope with EDS (manufactured by JEOL Ltd.), the coating layer was thin, and Y, Nb, and Ta whose content was low were not detected, however, La and Zr were detected at the surfaces of the $LiCoO_2$ particles. Based on the compositional ratio of $Li_{6.7}(La_{2.95}Y_{0.05})$ $(Zr_{1.7}Nb_{0.25}Ta_{0.05})O_{12}$, the compositional ratio of La to Zr was 2.95:1.7, and the content ratio of La to Zr detected by this measurement was 3.1:1 in molar ratio, and therefore, the compositional ratio substantially coincides therewith, so that $Li_{6.7}(La_{2.95}Y_{0.05})(Zr_{1.7}Nb_{0.25}Ta_{0.05})O_{12}$ is considered to be generated. Further, when with respect to the coating layers after the first heating step in the process for producing the solid electrolyte-coated positive electrode active material powders of the above Examples 9 to 12, measurement was performed using TG-DTA at a temperature raising rate of 10° C./min, only one exothermic peak in a range of 300° C. or higher and 1,000° C. or lower was observed in all the cases. From the results, it can be said that in the above Examples 9 to 12, the coating layer after the first heating step is formed from a substantially single crystal phase. In the above Examples 9 to 12, the coating layer of the constituent particle of the finally obtained solid electrolyte-coated positive electrode active material powder was constituted by a solid electrolyte having a garnet-type crystal phase, however, the precursor oxide constituting the coating layer after the first heating step had a pyrochlore-type crystal. In the above Examples 9 to 12, the content of the liquid component contained in the composition after the first heating step was 0.1 mass % or less in all the cases. In addition, in the above Examples 9 to 12, the crystal grain diameter of the oxide contained in the coating layer after the first heating step was 20 nm or more and 160 nm or less in all the cases.

The configurations of the solid electrolyte-coated positive electrode active material powders according to Examples 9 to 12 and Comparative Example 8 and the positive electrode active material powders according to Comparative Examples 7 and 9 are collectively shown in Table 3.

TABLE 3

| | Base particles | | Coating layer | | | |
|---|---|---|---|---|---|---|
| | Formulation | Average particle diameter D [μm] | Formulation | Crystal phase | Thickness T [nm] | T/D |
| Example 9 | $LiCoO_2$ | 7.0 | $Li_{6.7}(La_{2.95}Y_{0.05})(Zr_{1.7}Nb_{0.25}Ta_{0.05})O_{12}$ | garnet-type | 4.9 | 0.0007 |
| Example 10 | $LiCoO_2$ | 7.0 | $Li_{6.7}(La_{2.95}Y_{0.05})(Zr_{1.7}Nb_{0.25}Ta_{0.05})O_{12}$ | garnet-type | 22.7 | 0.0032 |
| Example 11 | $LiCoO_2$ | 7.0 | $Li_{6.7}(La_{2.95}Y_{0.05})(Zr_{1.7}Nb_{0.25}Ta_{0.05})O_{12}$ | garnet-type | 36.3 | 0.0052 |
| Example 12 | $LiNi_{0.5}Co_{0.2}Mn_{0.3}O_2$ | 7.0 | $Li_{6.7}(La_{2.95}Y_{0.05})(Zr_{1.7}Nb_{0.25}Ta_{0.05})O_{12}$ | garnet-type | 30.3 | 0.0043 |
| Comparative Example 7 | $LiCoO_2$ | 7.0 | — | — | — | — |
| Comparative Example 8 | $LiCoO_2$ | 7.0 | $LiNbO_3$ | trigonal system | 3.0 | 0.0004 |
| Comparative Example 9 | $LiNi_{0.5}Co_{0.2}Mn_{0.3}O_2$ | 7.0 | — | — | — | — |

[8] Evaluation of Solid Electrolyte-Coated Positive Electrode Active Material Powder By using each of the solid electrolyte-coated positive electrode active material powders according to Examples 9 to 12 and Comparative Example 8 obtained as described above, electrical measurement cells were produced as follows. Further, in the following description, a case where the solid electrolyte-coated positive electrode active material powders were used will be described, however, also with respect to Comparative Examples 7 and 9, electrical measurement cells were produced in the same manner except that the positive electrode active material powder was used in place of the solid electrolyte-coated positive electrode active material powder.

First, the solid electrolyte-coated positive electrode active material powder was powder-mixed with acetylene black (DENKA BLACK, manufactured by Denka Company Limited) that is an electric conduction assistant, and then, further a n-methylpyrrolidinone solution of 10 mass % polyvinylidene fluoride (manufactured by Sigma-Aldrich Japan) was added thereto, whereby a slurry was obtained. The content ratio of the solid electrolyte-coated positive electrode active material powder, acetylene black, and polyvinylidene fluoride in the obtained slutty was 90:5:5 in mass ratio.

Subsequently, the slurry was applied onto an aluminum foil and dried under vacuum, whereby a positive electrode was formed.

The formed positive electrode was punched into a disk shape with a diameter of 13 mm, and Celgard #2400 (manufactured by Asahi Kasei Corporation) as a separator was overlapped therewith. Then, an organic electrolyte containing $LiPF_6$ as a solute, and also containing ethylene carbonate and diethylene carbonate as nonaqueous solvents was injected, and as a negative electrode, a lithium metal foil manufactured by Honjo Metal Co., Ltd. was enclosed in a CR2032 coil cell, whereby an electrical measurement cell was obtained. As the organic electrolyte, LBG-96533 manufactured by Kishida Chemical Co., Ltd. was used.

Thereafter, the obtained electrical measurement cell was coupled to a battery charge-discharge evaluation system HJ1001SD8 manufactured by Hokuto Denko Corporation, and as CCCV charge and CC discharge, 0.2 C: 8 cycles, 0.5 C: 5 cycles, 1 C: 5 cycles, 2 C: 5 cycles, 3 C: 5 cycles, 5 C: 5 cycles, 8 C: 5 cycles, 10 C: 5 cycles, 16 C: 5 cycles, and 0.2 C: 5 cycles were performed. After cycles were repeated at the same C-rate, the charge-discharge characteristics were evaluated by a method of increasing the C-rate. The charge-discharge current at that time was set by calculation using 137 mAh/g as the actual capacity of $LiCoO_2$ and 160 mAh/g as the actual capacity of NCM523 based on the weight of the positive electrode active material of each cell.

The discharge capacity at 16 C discharge in the fifth cycle is collectively shown in Table 4. It can be said that as this numerical value is larger, the charge-discharge performance at a high load is excellent.

TABLE 4

| | Discharge capacity at 16 C discharge in 5th cycle [mAh] |
|---|---|
| Example 9 | 105 |
| Example 10 | 108 |
| Example 11 | 100 |
| Example 12 | 39 |
| Comparative Example 7 | 62 |
| Comparative Example 8 | 80 (however, capacity decreased at low load side) |
| Comparative Example 9 | 19 |

As apparent from Table 4, according to the present disclosure, excellent results were obtained. On the other hand, in Comparative Examples, satisfactory results could not be obtained. More specifically, in comparison of Examples 9 to 11 with Comparative Examples 7 and 8, in which the $LiCoO_2$ particles were used as the positive electrode active material for a lithium-ion secondary battery, an apparently excellent result was obtained in Examples 9 to 11 as compared with Comparative Examples 7 and 8. In comparison of Example 12 with Comparative Example 9, in which the $LiNi_{0.5}Co_{0.2}Mn_{0.3}O_2$ particles were used as the positive electrode active material for a lithium-ion secondary battery, an apparently excellent result was obtained in Example 12 as compared with Comparative Example 9.

Further, solid electrolyte-coated positive electrode active material powders were produced in the same manner as in the above Examples 9 to 12 except that each of the precursor solutions prepared in the same manner as described in the above Examples 2 to 8 was used in place of the precursor solution prepared in the same manner as described in the above Example 1, and evaluation was performed in the same manner as in the above [8] with respect to the solid electrolyte-coated positive electrode active material powders, similar results as those of the above Examples 9 to 12 were obtained.

What is claimed is:

1. A solid electrolyte, represented by the following compositional formula (1):

$$Li_{7-x}(La_{3-z}Y_z)(Zr_{2-x}M_x)O_{12} \quad (1)$$

wherein x and z satisfy 0.00<x<1.10, and 0.00<z≤0.15, and M is two or more types of elements selected from the group consisting of Nb, Ta, and Sb.

2. A method for producing a solid electrolyte comprising:
a mixing step of mixing multiple types of raw materials containing metal elements included in the following compositional formula (1), thereby obtaining a mixture;
a first heating step of subjecting the mixture to a first heating treatment thereby forming a calcined body; and
a second heating step of subjecting the calcined body to a second heating treatment thereby forming a crystalline solid electrolyte represented by the following compositional formula (1):

$$Li_{7-x}(La_{3-z}Y_z)(Zr_{2-x}M_x)O_{12} \quad (1)$$

wherein x and z satisfy 0.00<x<1.10, and 0.00<z≤0.15, and M is two or more types of elements selected from the group consisting of Nb, Ta, and Sb.

3. The method for producing a solid electrolyte according to claim 2, wherein a heating temperature in the first heating step is 500° C. or higher and 650° C. or lower.

4. The method for producing a solid electrolyte according to claim 2, wherein a heating temperature in the second heating step is 800° C. or higher and 1000° C. or lower.

5. A composite body, comprising:
an active material; and
the solid electrolyte according to claim 1 that coats a part of a surface of the active material.

* * * * *